United States Patent
Zyryanov

(10) Patent No.: US 12,123,956 B2
(45) Date of Patent: Oct. 22, 2024

(54) METHODS AND SYSTEMS FOR HANDLING OUTLIERS WHEN USING NAVIGATION SATELLITE SYSTEM OBSERVATIONS

(71) Applicant: Trimble Inc., Sunnyvale, CA (US)

(72) Inventor: Gleb Aleksandrovich Zyryanov, Moscow (RU)

(73) Assignee: Trimble Inc., Westminster, CO (US)

( * ) Notice: Subject to any disclaimer, the term of this patent is extended or adjusted under 35 U.S.C. 154(b) by 326 days.

(21) Appl. No.: 17/866,144

(22) Filed: Jul. 15, 2022

(65) Prior Publication Data

US 2023/0143995 A1    May 11, 2023

(30) Foreign Application Priority Data

Nov. 10, 2021    (RU) .......................... RU2021132733

(51) Int. Cl.
    *G01S 19/20*    (2010.01)
    *G01S 19/39*    (2010.01)
    *G01S 19/44*    (2010.01)

(52) U.S. Cl.
    CPC ............ *G01S 19/20* (2013.01); *G01S 19/393* (2019.08); *G01S 19/44* (2013.01)

(58) Field of Classification Search
    CPC ......... G01S 19/20; G01S 19/393; G01S 19/44
    (Continued)

(56) References Cited

U.S. PATENT DOCUMENTS

2005/0114023 A1    5/2005 Williamson et al.
2011/0090116 A1    4/2011 Hatch et al.
(Continued)

FOREIGN PATENT DOCUMENTS

EP    3 336 584 A1    6/2018
EP    3 792 665 A1    3/2021
(Continued)

OTHER PUBLICATIONS

Jurisch, R. et al., "Introducing the Determination of Hidden (Latent) Inner Restrictions within Linear Regression Analysis," Geodesy— The Challenge of the 3$^{rd}$ Millennium, Springer, Berlin, Heidelber, 2003, pp. 333-348.
(Continued)

*Primary Examiner* — Bo Fan
(74) *Attorney, Agent, or Firm* — Kilpatrick Townsend & Stockton LLP

(57) ABSTRACT

Some embodiments of the invention relate to methods carried out by an NSS receiver and/or a processing entity capable of receiving data therefrom, for estimating parameters derived from NSS signals and detecting outliers in NSS observables. Input data comprising signals observed by the receiver is received. An estimator is operated, which uses state variables and computes the values thereof based on the input data. An outlier detection procedure comprises: computing a first statistic based on data outputted from the estimator and associated with a set of observables; identifying an observable candidate for removal; computing a second statistic based on the data outputted from the estimator from which the data associated with the identified observable is removed; and determining whether the ratio of the first to the second statistic exceeds a threshold and, if so, removing the identified observable, having the estimator recompute its state variables and performing the outlier detection procedure again.

19 Claims, 13 Drawing Sheets

(58) Field of Classification Search
USPC .... 342/352, 357.23, 357.25, 357.27, 357.31, 342/357.68
See application file for complete search history.

(56) References Cited

U.S. PATENT DOCUMENTS

| | | | |
|---|---|---|---|
| 2011/0122022 | A1 | 5/2011 | Van Den Bossche et al. |
| 2016/0195617 | A1 | 7/2016 | Phatak et al. |
| 2019/0196024 | A1* | 6/2019 | Chen ................. G01S 19/44 |
| 2020/0096049 | A1* | 3/2020 | Lebas ................. F16D 3/60 |
| 2021/0072047 | A1* | 3/2021 | De Oliveira ........ G01D 5/2412 |

FOREIGN PATENT DOCUMENTS

| | | |
|---|---|---|
| EP | 3 130 943 B1 | 3/2022 |
| EP | 3 035 080 B1 | 8/2022 |

OTHER PUBLICATIONS

Sickle, J. V., "Two Types of Observables | GEOG 862: GPS and GNSS for Geospatial Professionals," John A. Dutton e-Education Institute, College of Earth and Mineral Sciences, The Pennsylvania State University, retrieved from https://www.e-education.psu.edu/geog862/node/1752 on Nov. 8, 2021, 4 pages.

Extended European Search Report for Application No. 22177198.3-1206, mailed Apr. 6, 2023, 25 pages.

Zair, S. et al., "A-Contrario Modeling for Robust Localization Using Raw GNSS Data," IEEE Transaction on Intelligent Transportation Systems, vol. 17, No. 5, May 2016, pp. 1354-1367.

Hewitson, S. et al., "GNSS receiver autonomous integrity monitoring (RAIM) performance analysis," GPS Solut (2006), published online Dec. 16, 2005, pp. 155-170.

Innac, A. et al., "Reliability testing for multiple GNSS measurement outlier detection," 2016 European Navigation Conference (ENC), IEEE, May 30, 2016, pp. 1-8.

Jiang, Z. et al., "Multi-Constellation GNSS Multipath Mitigation Using Consistency Checking," $24^{th}$ International Technical Meeting of the Satellite Division of The Institute of Navigation, Portland, OR, Sep. 19-23, 2011, pp. 3889-3902.

Partial European Search Report for Application No. 22177198.3-1206, mailed Dec. 8, 2022, 18 pages.

Brown, R. G. et al., "Self-Contained GPS Integrity Check Using Maximum Solution Separation," Navigation: *Journal of The Institute of Navigation*, vol. 35, No. 1, Spring 1988, 13 pages.

* cited by examiner

METHODS AND SYSTEMS FOR HANDLING OUTLIERS WHEN USING NAVIGATION SATELLITE SYSTEM OBSERVATIONS

CROSS-REFERENCE TO RELATED APPLICATIONS

The present application claims priority to Russian Patent Application No. 2021132733, filed Nov. 10, 2021, the entire contents of which are incorporated herein by reference for all purposes.

FIELD OF TECHNOLOGY

The invention relates to methods, systems, and computer programs using navigation satellite system (NSS) observations for position estimation or the like. The fields of application of the methods, systems, and computer programs include, but are not limited to, navigation, highly automated driving, autonomous driving, mapmaking, land surveying, civil engineering, agriculture, disaster prevention and relief, and scientific research.

BACKGROUND

Navigation satellite systems (NSS) include both global navigation satellite systems (GNSS) and regional navigation satellite systems (RNSS), such as the Global Positioning System (GPS) (United States), GLONASS (Russia), Galileo (Europe), BDS (China), QZSS (Japan), and the Indian Regional Navigational Satellite System (IRNSS, also referred to as NAVIC) (systems in use or in development). An NSS typically uses a plurality of satellites orbiting the Earth. The plurality of satellites forms a constellation of satellites. An NSS receiver detects a code modulated on an electromagnetic signal broadcast by a satellite. The code is also called a ranging code. Code detection includes comparing the bit sequence modulated on the broadcasted signal with a receiver-side version of the code to be detected. Based on the detection of the time of arrival of the code for each of a series of the satellites, the NSS receiver estimates its position. Positioning includes, but is not limited to, geolocation, i.e. the positioning on the surface of the Earth.

An overview of GPS, GLONASS and Galileo is provided for instance in sections 9, 10 and 11 of reference [1] (a list of references is provided at the end of the present description).

Positioning using NSS signal codes provides a limited accuracy, notably due to the distortion the code is subject to upon transmission through the atmosphere. For instance, the GPS includes the transmission of a coarse/acquisition (C/A) code at about 1575 MHz, the so-called L1 frequency. This code is freely available to the public, whereas the Precise (P) code is reserved for military applications. The accuracy of code-based positioning using the GPS C/A code is approximately 15 meters, when taking into account both the electronic uncertainty associated with the detection of the C/A code (electronic detection of the time of arrival of the pseudorandom code) and other errors including those caused by ionospheric and tropospheric effects, ephemeris errors, satellite clock errors, and multipath propagation.

An alternative to positioning based on the detection of a code is positioning based on carrier phase measurements. In this alternative approach or additional approach (ranging codes and carrier phases can be used together for positioning), the carrier phase of the NSS signal transmitted from the NSS satellite is detected, not (or not only) the code modulated on the signal transmitted from the satellite.

The approach based on carrier phase measurements has the potential to provide much greater position precision, i.e. down to centimetre-level or even millimetre-level precision, compared to the code-based approach. The reason may be intuitively understood as follows. The code, such as the GPS C/A code on the L1 band, has an effective chip length that is much longer than one cycle of the carrier on which the code is modulated. The position resolution may therefore be viewed as greater for carrier phase detection than for code detection.

However, in the process of estimating the position based on carrier phase measurements, the carrier phases are ambiguous by an unknown number of cycles. The fractional phase of a received signal can be determined but the additional number of cycles required to determine the satellite's range cannot be directly determined in an unambiguous manner. This is the so-called "integer ambiguity problem", "integer ambiguity resolution problem" or "phase ambiguity resolution problem", which may be solved to yield the so-called fixed solution.

GNSS observation equations for code observations and for carrier phase observations are for instance provided in reference [1], section 5. An introduction to the GNSS integer ambiguity resolution problem, and its conventional solutions, is provided in reference [1], section 7.2. The skilled person in the art will recognize that the same or similar principles apply to RNSS systems.

The main GNSS observables are therefore the carrier phase and code (pseudorange), the former being generally much more precise than the latter, but ambiguous. These observables enable a user to obtain the geometric distance from the receiver to the satellite. With known satellite position and satellite clock error, the receiver position and receiver clock error can be estimated.

As mentioned above, the GPS includes the transmission of a C/A code at about 1575 MHz, the so-called L1 frequency. More precisely, each GPS satellite transmits continuously using two radio frequencies in the L-band, referred to as L1 and L2, at respective frequencies of 1575.42 MHz and 1227.60 MHz. With the ongoing modernization of the GPS, signals on a third L5 frequency are becoming available. Among the two signals transmitted on L1, one is for civil users and the other is for users authorized by the United States Department of Defense (DoD). Signals are also transmitted on L2, for civil users and DoD-authorized users. Each GPS signal at the L1 and L2 frequencies is modulated with a pseudo-random number (PRN) code, and optionally with satellite navigation data. When GNSS satellites broadcast signals that do not contain navigation data, these signals are sometimes termed "pilot" signals, or "data-free" signals." In relation to GPS, two different PRN codes are transmitted by each satellite: a C/A code and a P code which is encrypted for DoD-authorized users to become a Y code. Each C/A code is a unique sequence of 1023 bits, which is repeated each millisecond. Other NSS systems also have satellites transmitting multiple signals on multiple carrier frequencies.

There is a constant need for improving the implementation of positioning or similar systems making use of NSS measurements, and, in particular to quickly obtain a precise estimation, so as to increase the productivity of positioning systems, especially, but not only, in the context of safety-critical applications such as highly-automated driving and autonomous driving.

SUMMARY

The present invention aims at addressing the above-mentioned need. The invention includes methods, systems, computer programs, computer program products and storage mediums as defined in the independent claims. Particular embodiments are defined in the dependent claims.

In one embodiment, a method is carried out by at least one of a navigation satellite system receiver, hereinafter abbreviated as "NSS receiver", and a processing entity capable of receiving data from the NSS receiver, for estimating parameters useful to, i.e. suitable to, determine a position. The NSS receiver observes at least one NSS signal from each of a plurality of NSS satellites over multiple epochs. The method comprises the following steps and/or operations: Input data is received. The input data comprises at least one of: (i) NSS signals observed by the NSS receiver, wherein the NSS signals comprise at least one NSS signal from a first NSS satellite and at least one NSS signal from a second NSS satellite, and (ii) information derived from said observed NSS signals. An estimation process, hereinafter referred to as "estimator", is operated, wherein the estimator uses state variables and computes the values of its state variables at least based on the received input data. A procedure, hereinafter referred to as "outlier detection procedure", is also performed, which comprises: (a) computing a first statistic based on data outputted from the estimator, the data being associated with a set, hereinafter referred to as "current set", of NSS observables; (b) identifying, among the NSS observables of the current set, an NSS observable candidate for removal from the current set; (c) computing a second statistic based on the outputted data (i.e., outputted from the estimator) from which the data associated with the identified NSS observable has been removed; and (d) determining whether the ratio of the first statistic to the second statistic exceeds a threshold, hereinafter referred to as "first threshold", and, if so, removing the identified NSS observable from the current set, having the estimator recompute the values of its state variables without the removed NSS observable, and performing the outlier detection procedure again based on data newly outputted from the estimator.

The method allows the effective identification and deselection of outliers (i.e., NSS observations containing unusually large errors, for example, errors which exceed three times the sigma value of the typical observations noise) in a set of NSS observations, while keeping as many observables and satellites as possible for computing a positioning solution or the like, so as to provide a high-accuracy solution even in harsh environments.

In one embodiment, a system comprises at least one of: a NSS receiver, and a processing entity capable of receiving data from the NSS receiver, the system being for estimating parameters useful to, i.e. suitable to, determine a position, the NSS receiver being configured for observing at least one NSS signal from each of a plurality of NSS satellites over multiple epochs, and the system being configured for carrying out the above-described method.

In some embodiments, computer programs, computer program products and storage media for storing such computer programs are provided. Such computer programs comprise computer-executable instructions for carrying out, when executed on a computer such as one embedded in a NSS receiver or in another apparatus, or when executed on a set of computers such as a set of computers embedded in a set of apparatuses, the above-described method.

BRIEF DESCRIPTION OF THE DRAWINGS

Embodiments of the present invention shall now be described in conjunction with the appended drawings in which:

FIG. 7b is a graph showing an estimate of the altitude over time of a stationary NSS receiver when using a method in accordance with an exemplary embodiment of the invention, using the same input data as the input data on which FIG. 7a is based;

FIG. 8b is a graph showing an estimate of the latitude over time of an NSS receiver when using a method in accordance with an exemplary embodiment of the invention, using the same input data as the input data on which FIG. 8a is based;

DETAILED DESCRIPTION

The present invention shall now be described in conjunction with specific embodiments. These serve to provide the skilled person with a better understanding but are not intended to in any way restrict the scope of the invention, which is defined by appended claims. In particular, the embodiments described throughout the description can be combined to form further embodiments to the extent that they are not mutually exclusive.

Throughout the following description, the abbreviation "GNSS" is sometimes used. The invention is, however, not limited to global navigation satellite systems (GNSS) but also applies to regional navigation satellite systems (RNSS).

Thus, it is to be understood that each occurrence of "GNSS" in the following can be replaced with "RNSS" to form additional embodiments.

When the term "real-time" is used in the present document, it means that there is an action (e.g., data is processed, results are computed) as soon as the required information for that action is available. Thus, certain latency exists, which depends on various aspects depending on the involved component(s) of the system.

In the art, the term "observables" is often used to refer to structures of an NSS signal from which observations or measurements can be made (PRN-code, carrier phase) (see e.g. reference [7]: "The word observable is used throughout GPS literature to indicate the signals whose measurement yields the range or distance between the satellite and the receiver."). However, in common usage, and in the present document, the term "observable" (also referred to as "NSS observable") is also interchangeably used to refer to the observation itself, such that, for example, "carrier phase observable" has the same meaning as "carrier phase observation". Further, when the present document describes that an NSS signal is observed, this means that at least an observation (measurement) of at least an observable of the NSS signal is made. By extension, in the present document, terms such as "delta carrier phase observables" are also sometimes used although delta carrier phase observables are strictly speaking not directly observed but constructed, i.e. computed, based on observables.

When the verb "broadcast" (and "broadcasting", etc.) is used, this also covers embodiments where the transmission is a form of multicasting.

Figure 1:
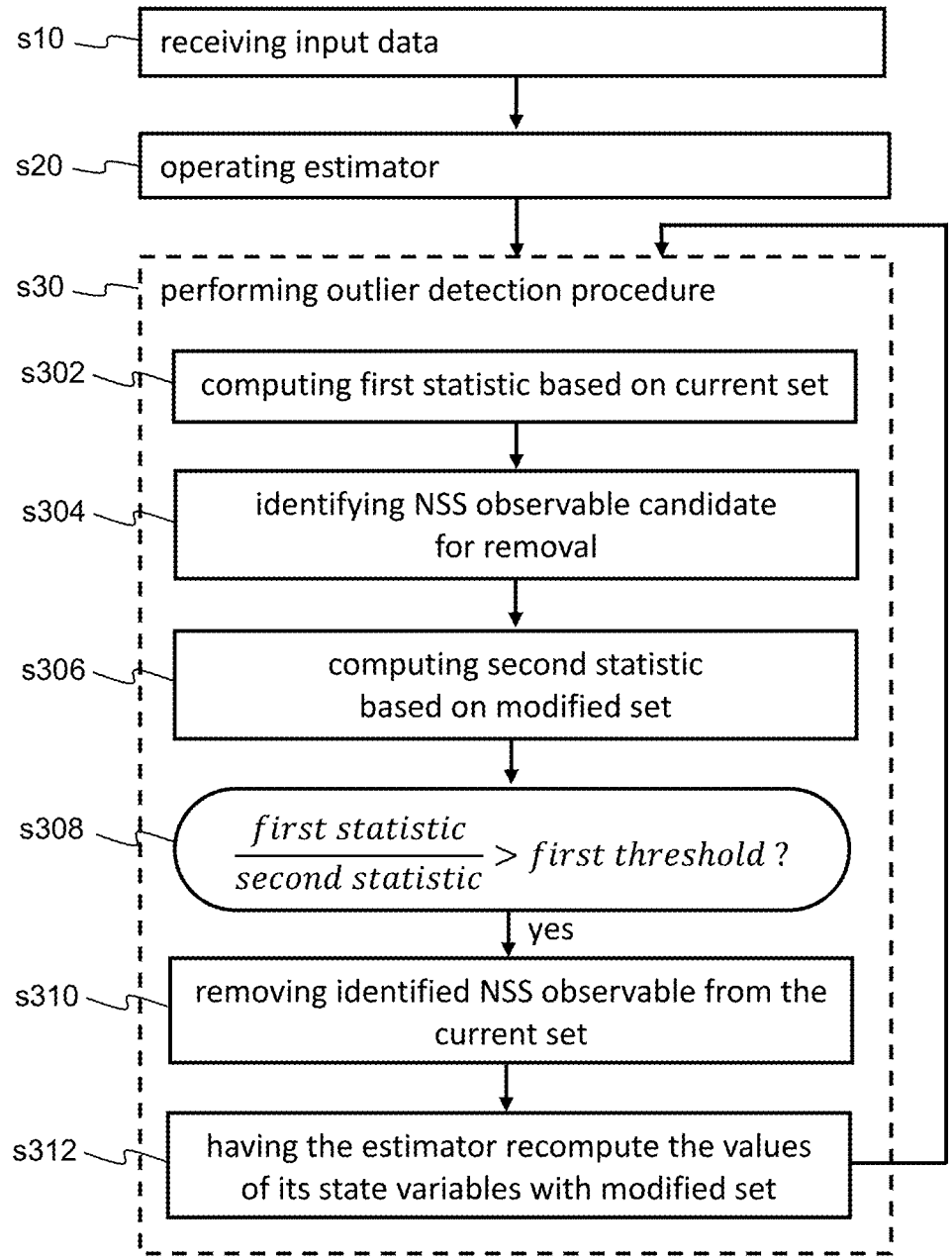
FIG. 1 is a flowchart of a method in one embodiment of the invention.

FIG. 1 is a flowchart of a method in one embodiment of the invention. The method may be carried out by a NSS receiver configured for observing NSS signals from a plurality of NSS satellites over multiple epochs, by another processing entity capable of receiving data from the NSS receiver, or by an NSS receiver in conjunction with such other processing entity. The processing entity may be remotely located from the NSS receiver and may receive data representing the NSS observations from the NSS receiver.

In one embodiment, the method aims at estimating parameters derived from NSS signals useful to, i.e. suitable to, determine a position, such as the position of a rover receiver or reference station. The method may eventually lead to estimating a rover position or reference station position, in addition to estimating an expected accuracy associated with said solution.

The estimated parameters may for example indicate the most probable number of carrier cycles along the distance separating an NSS satellite from the NSS receiver, i.e. the estimated parameters may be the resolved integer ambiguity. This also means that the method may estimate the position itself but not necessarily: parameters may be estimated that may be used, for example by another entity (such as a processing entity on a server dedicated to such task), to estimate or determine the position of the NSS receiver (i.e., the rover position) or of a reference station. Furthermore, other parameters such as, for example, properties of the ionosphere may be estimated. Indeed, if the position of both the NSS receiver and the plurality of NSS satellites are known, resolving the integer ambiguities may enable the determination of parameters affecting the transmission of the signals (or some components thereof) through the ionosphere or other parts of the atmosphere. Doing so is useful for example for generating a correction stream to be broadcasted to users (see e.g. references [2] and [3]).

Yet furthermore, beyond determining the position of a rover or a reference station, if the position of NSS receivers (such as reference stations) is known, solving the integer ambiguities in the carrier phases by solving observation equations may also be used to eventually estimate the position of a satellite.

The invention is, however, not limited to solving the integer ambiguities in the carrier phases. In some embodiments, pseudorange code observations are used rather than, or in addition to, carrier phase observations. In some embodiments, Doppler observations, i.e. Doppler measurements, are used instead of carrier phase observations and/or pseudorange code observations. In some embodiments, Doppler observations are used in addition to carrier phase observations. In some embodiments, Doppler observations are used in addition to pseudorange code observations. In some embodiments, Doppler observations are used in addition to both carrier phase observations and pseudorange code observations.

The application relying on NSS observations to produce an estimate of said parameters, or a combination thereof, may for example be a highly automated driving or autonomous driving application relying on NSS observations to produce an estimate of the position, velocity, or acceleration of a vehicle.

In step s10, input data is received, which comprises at least one of: (i) NSS signals observed by the NSS receiver, the NSS signals comprising at least one NSS signal from a first NSS satellite and at least one NSS signal from a second NSS satellite, and (ii) information derived from said NSS signals. For example, input data may comprise a first NSS signal at a first frequency from a first NSS satellite, a second NSS signal at a second frequency from the first NSS satellite, a third NSS signal at the first frequency from a second NSS satellite, a fourth NSS signal at the second frequency from a second NSS satellite, a fifth NSS signal at the first frequency from a third NSS satellite, and a sixth NSS signal at the first frequency from a fourth NSS satellite.

In step s20, an estimation process, hereinafter referred to as "estimator", is operated. The estimator uses state variables and computes the values of its state variables at least based on the received input data (from step s10). In one embodiment, the estimator computes a float solution using NSS signals observed by the NSS receiver. The float solution comprises the float solution per se and its associated covariance matrix. Exemplary ways to compute a float solution are known in the art, as apparent for example from section H.3.1 of reference [4]. In another embodiment, the estimator computes a trajectory solution using NSS signals observed by the NSS receiver. In a sub-embodiment of that embodiment, the estimator computes a trajectory solution using delta carrier phase observables (wherein "delta carrier phase observable" means time-differenced carrier phase observable). By "trajectory", it is here meant a change in position over time in contrast to an absolute position. An estimator computing a trajectory solution using delta carrier phase observables is advantageous in terms of implementation notably because it may involve a relatively small number of states.

The estimator is or comprises an algorithm, procedure, or process, or a piece of software and/or hardware configured for implementing such an algorithm, procedure, or process, in which a set of state variables (or "state vector") is maintained over time, i.e. the values of the state variables are estimated based measurements made over time. The measurements may comprise data representing the observed NSS signals. Step s20 may involve, for example, a Kalman filter and/or a least mean squares (LMS) estimator. In one embodiment, step s20 involves an LMS estimator with memory. In another embodiment, step s20 involves an LMS estimator without memory, i.e. an LMS estimator in which LMS estimates are computed independently per epoch. The invention is, however, not limited to the use of Kalman filter(s) and/or LMS estimator(s). Other estimation processes, filters, or filter techniques may be used.

The estimator's state variables may represent, for example, the position of the NSS receiver, an offset in the position of the NSS receiver relative to another position, an offset in the position of the NSS receiver relative to another epoch, the rate of change of the position, the rate of change of the offset in the position, a bias related to the NSS receiver, a bias related to any of the NSS satellites, a bias related to any of the satellite systems, a bias related to any of the NSS signals, and the rate of change of any of the said biases.

In step s30, a procedure, hereinafter referred to as "outlier detection procedure", is performed. The outlier detection procedure aims at identifying (i.e., detecting) and deselecting (i.e., removing) outliers from a set of NSS observations. More specifically, the outlier detection procedure comprises the following sub-steps.

In sub-step s302, a first statistic is computed based on data outputted from the estimator, the data being associated with a set, hereinafter referred to as "current set", of NSS observables. The current set of NSS observables may initially contain all available NSS observables. A statistic is hereby defined as a characteristic of data associated with a set of NSS observables under consideration. In other words, the statistic is a metric or measure of data associated with the set of NSS observables.

In one embodiment, the current set of NSS observables initially contains two observables. In another embodiment, the current set of NSS observables initially contains more than two observables, and preferably more than five observables.

In sub-step s304, an NSS observable that is candidate for removal from the current set is identified among the NSS observables of the current set. In one embodiment, the identification operation performed in sub-step s304 makes use of a criterion, or a plurality of criteria, suitable for identifying an outlier or at least a potential outlier in the current set.

In sub-step s306, a second statistic is computed based on the data outputted from the estimator from which the data associated with the NSS observable identified in sub-step s304 has been removed. In one embodiment, the second statistic uses the same function as the function that the first statistic uses except that, for computing the second statistic, the data associated with the NSS observable identified in sub-step s304 is not used.

Then, in sub-step s308, whether the ratio of the first statistic to the second statistic exceeds a threshold, hereinafter referred to as "first threshold", is determined. If so, i.e. if the ratio of the first statistic to the second statistic exceeds the first threshold, the NSS observable identified in sub-step s304 is removed, in sub-step s310, from the current set, thus modifying and more specifically reducing the current set. The estimator then recomputes, in sub-step s312, the values of its state variables without the removed NSS observable, i.e. the re-computation is performed based on the reduced set of NSS observables. The outlier detection procedure is then performed again based on data newly outputted from the estimator (as schematically illustrated by the arrow from box "s312" towards dashed box "s30" in FIG. 1), with the reduced set of NSS observables being the current set of NSS observables for this new occurrence of the outlier detection procedure. The outlier detection procedure may therefore be carried out several times in sequence, each occurrence leading to a further reduction of the number of NSS observables in the current set, until a condition is met.

If it is determined, in sub-step 308, that the ratio of the first statistic to the second statistic does not exceed the first threshold, various steps may be performed (not illustrated in FIG. 1). Reference is made in that respect to the embodiments schematically illustrated by FIG. 3 (see especially reference s316) and FIGS. 4-5 (see especially references s320 to s334), which will be described further below.

The method allows the effective identification and deselection of outliers in a set of NSS observations by providing means for generally distinguishing therein outliers from NSS observations that are just one of many noisy NSS observations. An outlier may be present as a result of various events (as explained for example in reference [5], paragraph [0035], second sentence). The method aims at identifying and deselecting outliers while keeping as many observables and satellites as possible for computing a positioning solution or the like, so as to provide a high-accuracy solution even in harsh environments. The method may be used in, although not limited to being used in, a delta-carrier-phase GNSS trajectory estimator for computing a high-rate (i.e., high update rate), low-latency solution for the user, such a trajectory estimator configured for processing delta-carrier-phase observables as the source of precise measurements and estimating a change in position between epochs. This is because a typical delta-carrier-phase GNSS trajectory estimator can be designed with for example a Kalman filter or a LMS estimator with a relatively small number of states, thus ensuring effective computation of above-mentioned statistics and effective re-computation of estimated states with update (reduced) set of observables.

Figure 3:
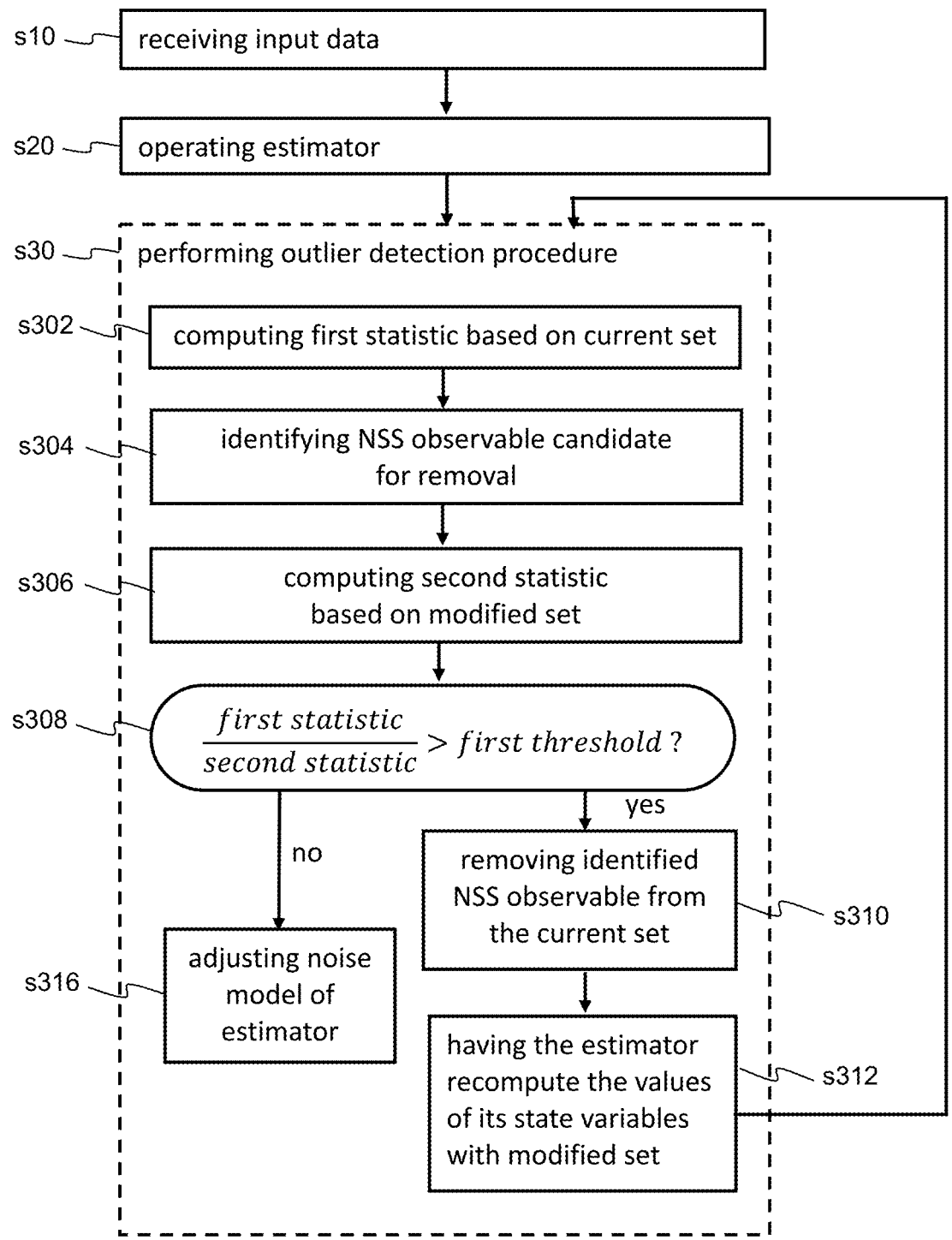
FIG. 3 is a flowchart of a method in one embodiment of the invention, further comprising adjusting the noise model of the estimator if the ratio of the first statistic to the second statistic is not larger than the first threshold.
Figure 5:
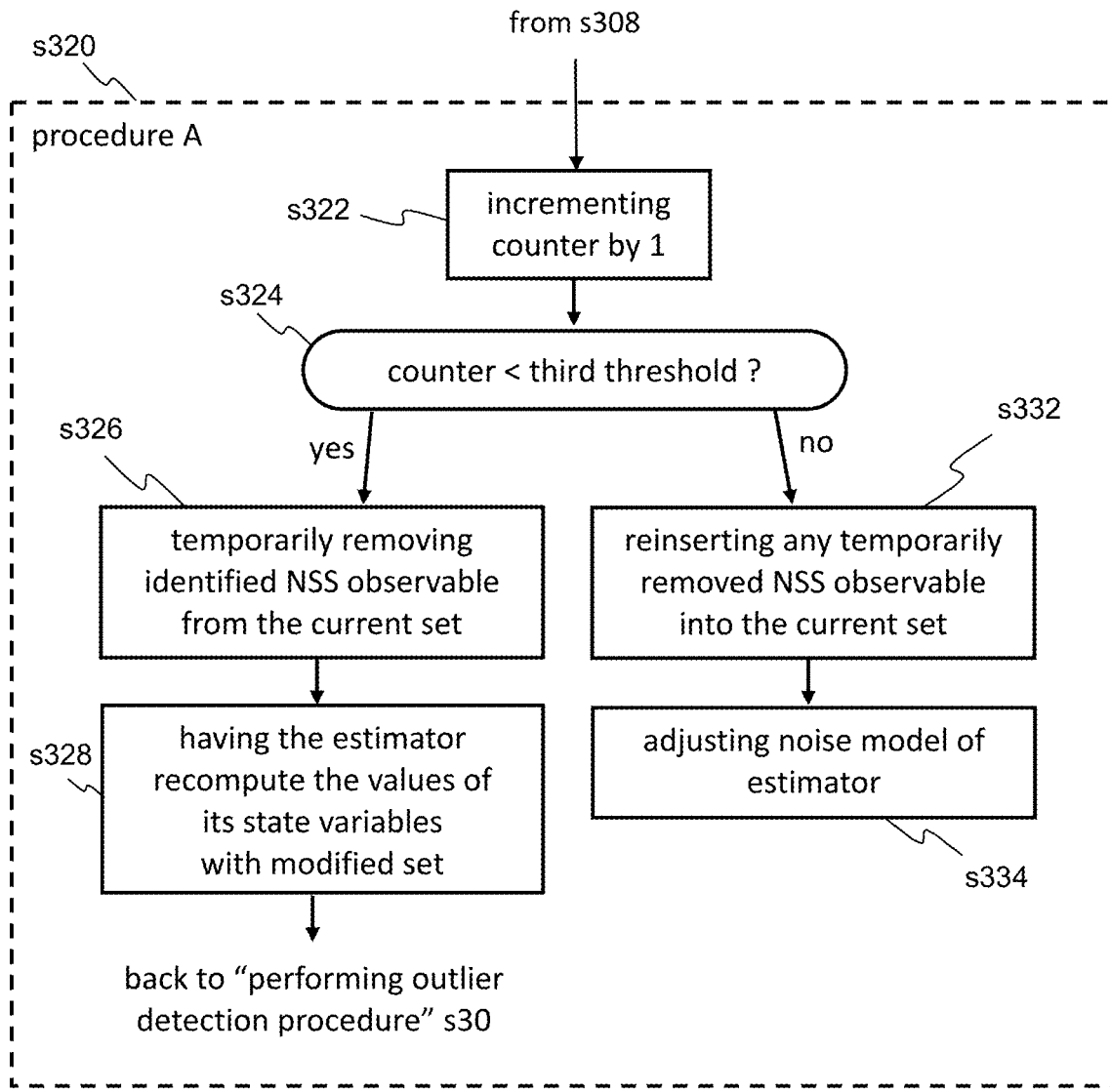
FIG. 5 is a flowchart of procedure A as depicted in FIG. 4.

In one embodiment, if it is determined, in sub-step 308, that the ratio of the first statistic to the second statistic does not exceed the first threshold, a procedure is carried out, which comprises adjusting the noise model for the remaining NSS observables used by the estimator (not illustrated in FIG. 1, but see for example step 316 in FIG. 3 and step s334 in FIG. 5). Using an adaptive noise model generally ensures optimal positioning results and does not require the initial provision of an adequate a priori noise model. Not requiring the initial provision of an adequate a priori noise model is advantageous in that this frees the user or designer from the task of adjusting the noise model assumptions for different use cases (e.g. high-vibration or static survey). An over-optimistic noise model or any other noise model is initially selected instead.

In one embodiment, the noise model adjustment is performed in the same manner for all satellites. In other words, the noise model is adjusted identically for all satellites (e.g., scaling the a priori noise model by multiplying it by the same scale factor for all satellites). The invention is, however, not limited to that embodiment. For example, the noise model adjustment may be performed per satellite (e.g., by selecting different scale factors for different observables).

In one embodiment, the first statistic and the second statistic each comprise at least one of: (i) a chi-squared statistic, and (ii) an empirically selected test-statistic. That is, using a chi-squared statistic is optional. Another test-statistic may be selected for example by evaluating and simulating NSS error distributions using suitable computer software.

In one embodiment, the first threshold is a value associated with a percentile of a distribution underlying the ratio of the first statistic to the second statistic, wherein the percentile is preferably a value comprised between 90 and 99.5 percent, and more preferably a value comprised between 93 and 98 percent. For example, the percentile may for example be 95, 97.5, or 99 percent. Since the first threshold is a value associated with a percentile of a distribution underlying the ratio of the first statistic to the second statistic, the first threshold depends on the number degree of freedom (NDF), i.e. on the number of observables. Percentiles for a conventional chi-squared distribution are defined for each NDF independently and, in one embodiment, the same is true for the ratio of the first statistic to the second statistic. The first threshold may for example be stored in a look-up table containing values for all NDF values at least up to a maximum expected NDF. The maximum expected NDF may be based on receiver tracking capabilities and thus on the expected maximum number of observables that may have to be processed. The look-up table may be stored in a computer-implemented memory.

In one embodiment, the data that is outputted from the estimator and based on which the first statistic and the second statistic are computed comprises residuals, each residual corresponding to, i.e. being associated with, an NSS observable. The residuals are obtained from the estimator, each residual being associated with at least one observable. As known in the art, the residual associated with an observable is the difference between the observable and the estimated (predicted) observable. The first statistic and the second statistic may therefore reflect the magnitude of the residuals. The smaller the residuals, the more likely it becomes that the set of observables is a set of observables without outliers.

In one embodiment, the residuals comprise at least one of: code observation residuals, carrier phase observation residuals, Doppler observation residuals, delta code observation residuals, and delta carrier phase observation residuals (wherein "delta carrier phase observation" means time-differenced carrier phase observations).

In one embodiment, post-fit residuals, also called a posteriori residuals, are used. The post-fit residual associated with an observable is the difference between the observable at time t and the estimated (predicted) observable based on information available until and including time t and after updating the states of the estimator.

In another embodiment, pre-fit residuals, also called innovations or a priori residuals, are used. The pre-fit residual associated with an observable is the difference between the observable at time t and the estimated (predicted) observable based on information available until and including time t but before updating the states of the estimator. In other words, pre-fit residuals are the difference between an observable and the estimated observable obtained from a pre-selected dynamic model associated with the observable.

In one embodiment, each of the first statistic and the second statistic are computed based on data comprising a vector formed by values each based on one of the residuals under consideration together with its associated standard deviation. The standard deviation associated with a residual is an a priori standard deviation associated with the NSS observable with which the residual is associated. In other words, the standard deviation forms part of the observables noise model used, at the point in time under consideration, by the estimator.

In one embodiment, the first statistic comprises the sum, over all the NSS observables of the current set, of the ratio of the squared residual corresponding to the NSS observable under consideration to the squared standard deviation corresponding to the NSS observable under consideration, and the second statistic comprises the sum, over all the NSS observables of the current set from which the identified NSS observable has been removed, of the ratio of the squared residual corresponding to the NSS observable under consideration to the squared standard deviation corresponding to the NSS observable under consideration. In that context, the residuals based on which the first statistic is computed result from the operation of the estimator with the current set of NSS observables, whereas the residuals based on which the second statistic is computed result from the operation of the estimator with a reduced set of NSS observables. In other words, the number of residuals is not only smaller for computing the second statistic, the residuals are also obtained from processing a reduced set of NSS observables.

In such an embodiment, the ratio of the first statistic to the second statistic may for example be expressed mathematically as follows:

$$\text{ratio} = \frac{\sum \frac{r_i^2}{\sigma_i^2}}{\sum_{k \neq identified\ NSS\ observable} \frac{r_{reduced\ set,i}^2}{\sigma_i^2}}$$

wherein i is the index corresponding an NSS observable, $r_i$ is the residual corresponding to the NSS observable with index i and resulting from the operation of the estimator with the current set of NSS observables, $r_{reduced\ set,i}$ is the residual corresponding to the NSS observable with index i and resulting from the operation of the estimator with the reduced set of NSS observables, and $\sigma_i$ is the standard deviation corresponding to the NSS observable with index i.

In one embodiment, the first statistic comprises the sum, over all the NSS observables of the current set, of the ratio of the absolute value of the residual corresponding to the NSS observable under consideration to the standard deviation corresponding to the NSS observable under consideration, and the second statistic comprises the sum, over all the NSS observables of the current set from which the identified NSS observable has been removed, of the ratio of the absolute value of the residual corresponding to the NSS observable under consideration to the standard deviation corresponding to the NSS observable under consideration. In that context, as explained in relation to the previous embodiment, the residuals based on which the first statistic is computed result from the operation of the estimator with the current set of NSS observables, whereas the residuals based on which the second statistic is computed result from the operation of the estimator with a reduced set of NSS observables. In other words, the number of residuals is not only smaller for computing the second statistic, the residuals are also obtained from processing a reduced set of NSS observables.

In such an embodiment, the ratio of the first statistic to the second statistic may for example be expressed mathematically as follows:

$$\text{ratio} = \frac{\sum \frac{|r_i|}{\sigma_i}}{\sum_{k \neq identified\ NSS\ observable} \frac{|r_{reduced\ set,i}|}{\sigma_i}}$$

wherein | . . . | is the absolute value operator.

In one embodiment, the first statistic comprises the maximum absolute value, over all the NSS observables of the current set, of the ratio of the residual corresponding to the NSS observable under consideration to the standard deviation corresponding to the NSS observable under consideration, and the second statistic comprises the maximum absolute value, over all the NSS observables of the current set from which the identified NSS observable has been removed, of the ratio of the residual corresponding to the NSS observable under consideration to the standard deviation corresponding to the NSS observable under consideration. In that context, as explained in relation to the two previous embodiments, the residuals based on which the first statistic is computed result from the operation of the estimator with the current set of NSS observables, whereas the residuals based on which the second statistic is computed result from the operation of the estimator with a reduced set of NSS observables. In other words, the number of residuals is not only smaller for computing the second statistic, the residuals are also obtained from processing a reduced set of NSS observables.

In such an embodiment, the ratio of the first statistic to the second statistic may for example be expressed mathematically as follows:

$$\text{ratio} = \frac{\max\left|\frac{r_i}{\sigma_i}\right|}{\max\limits_{i \neq \text{identified NSS observable}}\left|\frac{r_{\text{reduced set},i}}{\sigma_i}\right|}$$

In one embodiment, identifying s304, among the NSS observables, an NSS observable candidate for removal comprises identifying the NSS observable which removal from the current set results in the smallest second statistic.

FIG. 1 schematically illustrates the operations of the method as sequential steps and sub-steps. For processing NSS observations relating to one receiver epoch, the steps may be performed sequentially. However, the operations of the method may also be carried out in parallel, for example for successive receiver epochs.

In one embodiment, the method is performed at the receiver epoch rate. In another embodiment, the method is performed at a lower rate than the receiver epoch rate. In one embodiment, the outlier detection procedure is performed when a new set of measurements are used to update the positioning solution, and/or when the positioning solution is propagated using the estimator (regarding the meaning of "estimator" here, see above discussion of step s20). In one embodiment, the method is performed at a lower rate than the receiver epoch rate depending on a criterion, such as depending on the number of available satellites. For example, the method may be configured to be performed only if the number of available satellites is 6 or larger than 6. In another example, with a highly-inertial systems (heavy car, airplane) and with high update rate (100 Hz), the method may for example be performed at 10 Hz and another outlier detection procedure may be used during the other epochs, e.g. simply checking pre-fit residuals (residuals computed before updating the state vector).

In one embodiment, the method is performed at least partially as part of a data post-processing process. In other words, the invention is not limited to a real-time operation. Rather, it may be applied for processing pre-collected data to determine a position, or other information, in post-processing. For example, the observations may be retrieved from a set of data which was previously collected and stored; the processing may be conducted for example in an office computer long after the data collection and thus not in real-time.

Figure 2A:
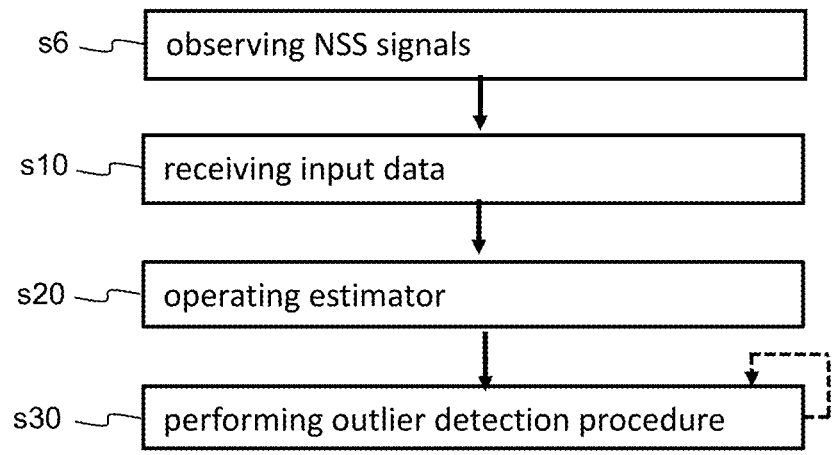
FIG. 2a is a flowchart of a method in one embodiment of the invention, further comprising observing NSS signals.

FIG. 2a is a flowchart of a method in one embodiment of the invention, further comprising a step s6 of observing NSS signals. That is, in this embodiment, steps s10 to s30 (including the sub-steps of step s30) are carried out at least by an NSS receiver, and the NSS receiver also carries out step s6 of observing NSS signals.

Figure 2B:
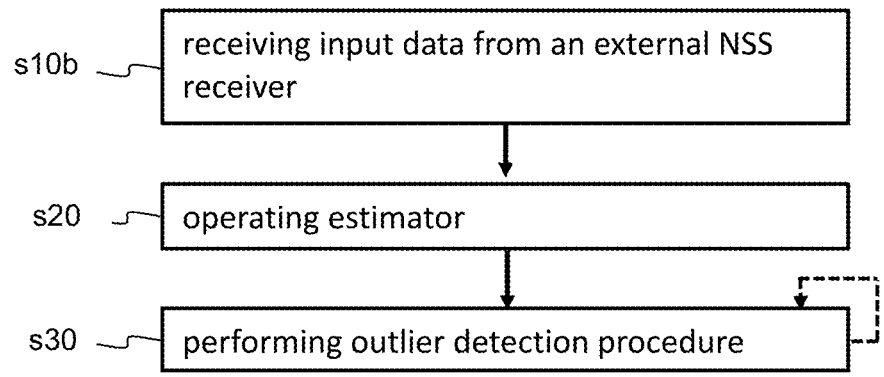
FIG. 2b is a flowchart of a method in one embodiment of the invention, wherein input data is received by a processing entity from an NSS receiver.

FIG. 2b is a flowchart of a method in another embodiment of the invention, wherein an NSS receiver observes NSS signals (not illustrated in FIG. 2b) and, then, in contrast to FIG. 2a, the NSS receiver transmits data representing the observed NSS signals to another processing entity or set of processing entities in charge of carrying out steps s10 to s30 (including the sub-steps of step s30). The data representing the observed NSS signals may for example be transmitted in the form of data packets, such as IP packets, through, for example, any one of, or a combination of, the Internet, a cellular network, and a suitable satellite link. The skilled person would, however, appreciate that other forms of wired or wireless transmission may be used, such as, and without being limited to, wireless transmissions based on Bluetooth, Wi-Fi, or Li-Fi. In one embodiment, the data representing the observed NSS signals is transmitted in real-time, i.e. as soon as available (in line with the above-mentioned definition of the term "real-time"). In one embodiment, the data representing the observed NSS signals is transmitted as a data stream in that messages containing said data are transmitted at regular or irregular intervals through the same communication medium or channel. The data representing the observed NSS signals may be encoded and/or encrypted prior to transmission.

FIG. 3 is a flowchart of a method in one embodiment of the invention, further comprising adjusting s316 the noise model of the estimator if it is determined, in sub-step s308, that the ratio of the first statistic to the second statistic is not larger than the first threshold. The term "noise model", which is known in the art, refers to a mathematical model representing the expected or assumed value of the error in an observable over time (e.g., code, carrier phase, Doppler, etc.). As mentioned above, using an adaptive noise model, i.e. adjusting the noise model of the observables or remaining observables in the current set, generally ensures optimal positioning results and does not require the initial provision of an adequate a priori noise model. After the adjustment of the noise model of the estimator (sub-step s316), the outlier detection procedure is not carried out again and the current set of NSS observables is regarded as not comprising outliers.

In one embodiment, adjusting s316 the noise model of the estimator comprises scaling the noise model based on the last computed first statistic. By "last computed first statistic", it is meant that, when the step of computing a first statistic has been carried out several times before reaching the point where it is determined that the ratio of the first statistic to the second statistic does not exceed the first threshold, the noise model is adjusted based on the first statistic that was last computed before reaching that point.

In one embodiment, the first statistic comprises a chi-squared statistic, and scaling, in step s316, the noise model based on the last computed first statistic comprises multiplying each a priori standard deviation respectively associated with one of the NSS observables in the noise model by a scaling factor that would make the recomputed chi-squared statistic match another threshold, hereinafter referred to as "second threshold", associated with the chi-squared distribution for the estimator's current number of degrees of freedom (NDF). In other words, the observable noise model is scaled to match the actual noise level at a given epoch, i.e. in the environment existing at the given epoch.

In that embodiment, the second threshold may be selected as a percentile for the chi-squared distribution. This may for example be a percentile between 90% and 99.9%, preferably between 98% and 99.5%. As known to the skilled person, percentiles for the chi-squared distribution depend on the NDF.

In one embodiment, the scaling factor is computed as follows:

$$\text{scaling factor} = \alpha \cdot \frac{\chi^2}{X(ndf)}$$

where $\alpha$ is a tuning coefficient (for example: $\alpha$=0.25), $\chi^2$ is the latest computed first statistic, and X(ndf) is 99% point of the chi-squared distribution for the current NDF.

Other statistics than the chi-squared statistic may also be used. If another statistic than the chi-squared statistic is used, one may for example (a) compute the chi-squared statistic for the current set of NSS observables (i.e., the current set that has been finally obtained by performing the outlier detection procedure) and perform above-mentioned scaling, or (b) use some percentile for the empirically estimated distribution for the statistic being used.

Figure 4:
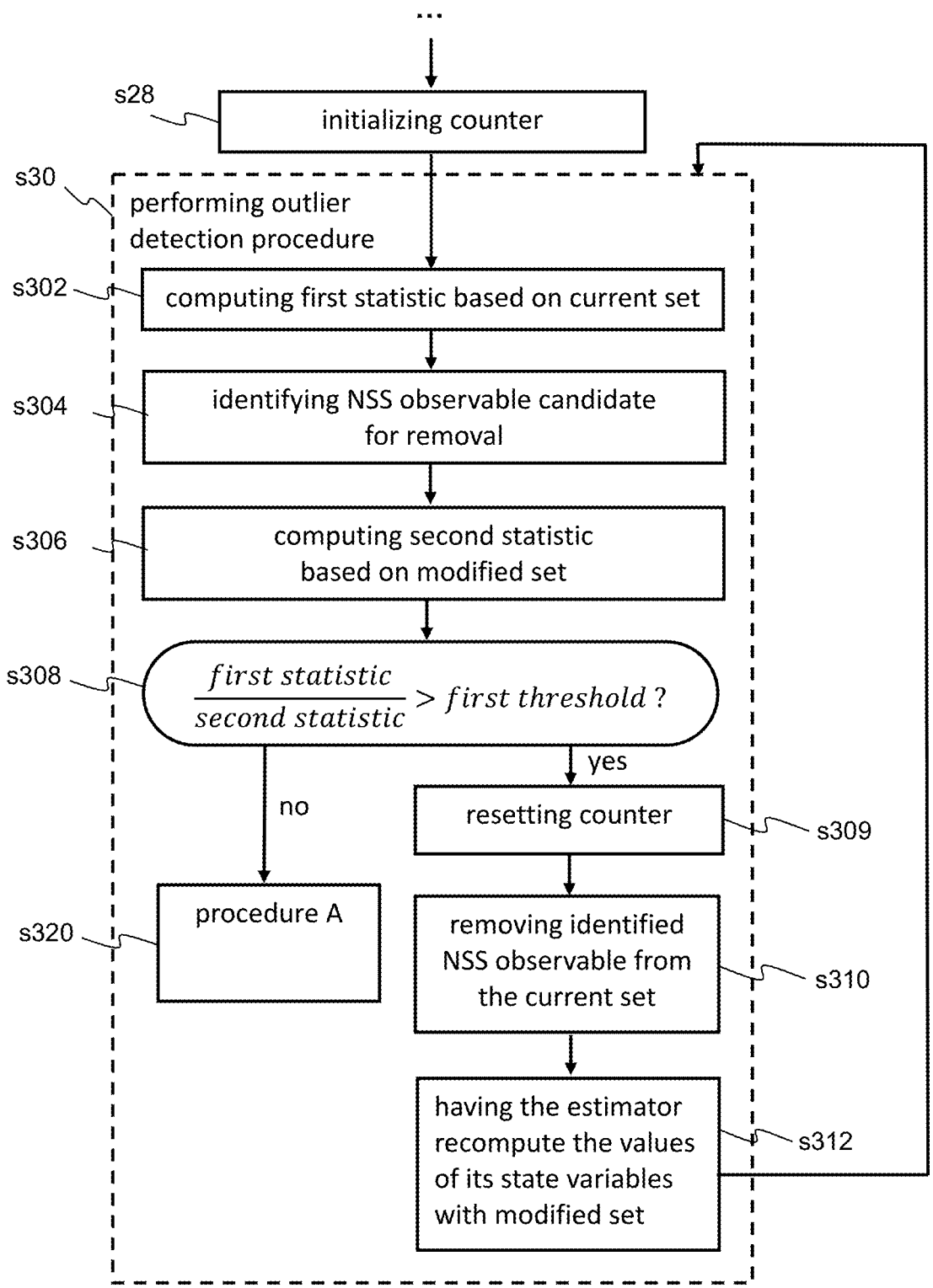
FIG. 4 is a flowchart of a portion of a method in one embodiment of the invention, further comprising a procedure A performed if the ratio of the first statistic to the second statistic is not larger than the first threshold.

FIG. 4 is a flowchart of a portion of a method in one embodiment of the invention, further comprising a procedure, hereinafter referred to as "procedure A", performed if it is determined (in sub-step s308) that the ratio of the first statistic to the second statistic is not larger than the first threshold, and FIG. 5 is a flowchart of an embodiment of procedure A as depicted in FIG. 4. The ellipse, i.e. " . . . ", illustrated in the upper part of FIG. 4, represents steps s10 and s20 and any other steps or operations performed before step s28. Specifically, the method further comprises, as depicted in FIG. 4, initializing s28, before carrying out the outlier detection procedure, a counter for counting a number of temporarily removed NSS observables. Then, if it has been determined in sub-step s308 that the ratio of the first statistic to the second statistic does not exceed the first threshold, the counter is incremented s322 by 1 (see FIG. 5). It is then determined, in sub-step s324, whether the counter's value is smaller than another threshold, hereinafter referred to as "third threshold". If so, the identified NSS observable is temporarily removed s326 from the current set, the estimator recomputes s328 the values of its state variables without the temporarily removed NSS observable, and the outlier detection procedure is performed again based on data newly outputted from the estimator and without resetting the counter.

If it has been determined, in sub-step 324, that the counter's value is not smaller than the third threshold, any temporarily removed NSS observable is reinserted s332 into the current set and a noise model of the estimator is adjusted s334. After the adjustment of the noise model of the estimator (sub-step s334), the outlier detection procedure is not carried out again and the current set of NSS observables is regarded as not comprising outliers.

If it has been determined in sub-step s308 that the ratio of the first statistic to the second statistic exceeds the first threshold, the counter is reset s309, i.e. set back to zero. In sub-step s310, the latest identified NSS observable is removed from the current set, and those NSS observables that were temporarily removed (if any) are neither reinserted into the current set of NSS observables nor into the modified set of NSS observables. In other words, any temporarily removed NSS observable remains isolated. The method then proceeds to sub-step s312 as described with reference to FIG. 1.

In one embodiment, each temporarily removed NSS observable is associated with its own scaling factor, which is based on the latest first statistic computed at the point in time of the temporary removal. Upon reaching the step of adjusting s334 the noise model, any temporarily removed NSS observable is restored into the processing, but with a higher or much higher standard deviation (because the first statistic computed earlier is higher than to the first statistic computed afterwards).

In another embodiment, instead of automatically restoring any temporarily removed NSS observable when reaching step s332, each of them may be kept permanently removed if an outlier was identified after their temporary removal.

In one embodiment, the third threshold, which is a counter threshold, is a value selected among the following values: 2, 3, 4, and 5. The value may be selected empirically, for example by testing the method in a situation where the position of the NSS receiver is known. In one embodiment, the third threshold is an integer value.

The embodiment described with reference to FIGS. 4 and 5 typically increases the overall robustness of the method because, in challenging environments (e.g., canopy, high-multipath environment), several NSS observables may constitute large outliers and may therefore have similar effects on the position quality and computed residuals. In such cases, isolation of only one of those NSS observables often does not lead to a significant change in the statistic, so that the ratio under consideration (i.e., first statistic divided by second statistic) may be too small to determine that an outlier is present. Yet, after deselecting a first outlier, the deselection of a second outlier often leads to a significant improvement in accuracy, thus reducing residuals and generating a sufficiently small second statistic to exceed the threshold for the ratio of statistics and thus to identify those NSS observables as outliers.

However, the inventor has also observed that a good-quality NSS observable (i.e., an NSS observable that is not an outlier) can sometimes be incorrectly identified as the best candidate for removal. This is a seldom event and it would typically lead to a small statistics ratio. If the outlier detection procedure were to stop there, noise model scaling would result in large noise estimates, which would have a negative effect on the final accuracy. Meanwhile, the inventor has found that the probability of detecting the true outlier in the next step (if an outlier actually exists) is relatively high based on empirical testing.

Figure 6:
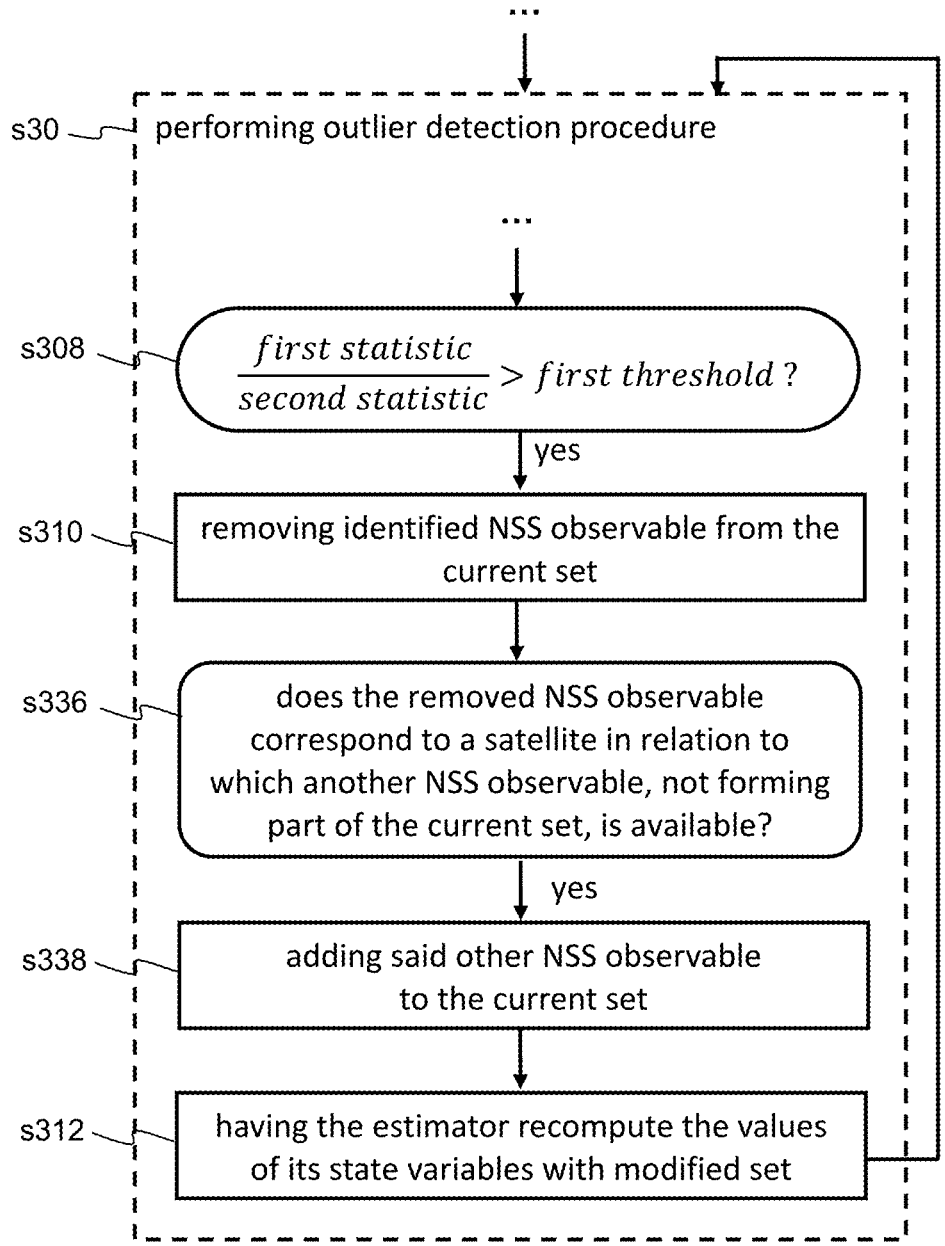
FIG. 6 is a flowchart of a portion of a method in one embodiment of the invention, which further comprises the replacement of a removed observable by another observable.

FIG. 6 is a flowchart of a portion of a method in one embodiment of the invention, which further comprises the replacement of a removed observable by another observable. The first ellipse, i.e. " . . . ", illustrated in the upper part of FIG. 6, represents steps s10 and s20 and any other steps or operations performed before step s30, and the second ellipse represents sub-steps s302 to s306 and any other sub-steps or operations performed before sub-step s308 as part of the outlier detection procedure. Specifically, in that embodiment, in the outlier detection procedure, the current set of NSS observables corresponding to the data outputted from the estimator and based on which the first statistic is computed comprises not more than one NSS observable per NSS satellite. That is, a single NSS observable, or no NSS observable, is selected per NSS satellite. The selection may for example be based on the signal-to-noise ratio (SNR) of the NSS signal associated with said NSS observable, as obtained by the NSS receiver. Other criteria may be used, however.

The outlier detection procedure further comprises the following steps. If it has been determined, in sub-step 308, that the ratio of the first statistic to the second statistic exceeds the first threshold, the following is further performed. After step s310, it is determined s336 whether the removed NSS observable corresponds to a satellite in relation to which another NSS observable, not forming part of the current set, is available. If so, said other NSS observable is added s338 to the current set, in which case the estimator recomputes s312 the values of its state variables with the removed NSS observable being replaced with the added other NSS observable. The outlier detection procedure is then performed again based on data newly outputted from the estimator (as schematically illustrated by the arrow from box "s312" towards dashed box "s30" in FIG. 6), with the modified set of NSS observables being the current set of NSS observables for this new occurrence of the outlier detection procedure.

If it is determined, in sub-step 308, that the ratio of the first statistic to the second statistic does not exceed the first threshold, various steps may be performed (not illustrated in FIG. 6). Reference is made in that respect to the embodiments schematically illustrated by FIG. 3 (see especially reference s316) and FIGS. 4-5 (see especially references s320 to s334).

The embodiment described with reference to FIG. 6 is advantageous for at least the following reasons:
a) First, this embodiment allows to minimize CPU consumption by processing a smaller number of observables and applying a more CPU-efficient outlier detection procedure for the remaining NSS observables (e.g. by performing a priori residual checks).
b) Second, this embodiment puts all satellites on an equal footing, whereas otherwise some satellites might have only one NSS observable, while others might have several NSS observables (e.g. for a Galileo satellite one may for example have observables from signals E1, E5A, E5B, E5AltBoc, and E6). This would put the satellites in unequal conditions and make the outlier detection procedure less reliable, as a faulty satellite with several NSS observables is more likely to include an unidentified solution. Although techniques to overcome this dependency exist, such as the one described in reference [6], the embodiment described with reference to FIG. 6 is generally more computationally efficient as explained in above item a).

Before discussing further embodiments of the invention, let us now further explain, in section A below, the context in which some embodiments of the invention have been developed, for a better understanding thereof, as well as some technical considerations that may be helpful for understanding some embodiments of the invention and problems addressed by these embodiments.

A. Introduction to the Context in which Some Embodiments of the Invention have been Developed Some chi-squared tests may successfully identify outliers, but they rely on the provision of an a priori noise model. An over-optimistic noise model may result in false outlier detections and degrading satellite constellation geometry. In contrast, an over-pessimistic noise model may result in missing outliers and degrading the solution.

With WI being the measurements, $\vec{\sigma}$ being the observation noise, $\vec{x}$ being the updated state vector (i.e., the position estimate), H being a design matrix, $\vec{r}$ being the residuals, the residuals are:

$$\vec{r} = \vec{m} - H\vec{x},$$

the normalized residuals are:

$$\frac{r_i}{\sigma_i}$$

and the chi-squared test statistic is:

$$\chi^2 = \sum_i \frac{r_i^2}{\sigma_i^2}$$

The assumption underlying an outlier detection method based on a chi-squared statistic is that the residuals $\vec{r}$ have a Gaussian distribution with zero mean and a standard deviation equal to $\vec{\sigma}$. The chi-squared test allows to answer the question as to whether the a priori noise model matches the actual noise.

Namely, for each number degree of freedom (NDF), a different chi-squared distribution is provided. A percentile (for example 99% or 95%) is then defined and the test statistic is checked against this percentile.

If the chi-squared test fails (this meaning that the noise model is inadequate), one may search for the best candidate (worst observable) to deselect, such as the one that has the largest normalized residual, or the one that would minimize the chi-squared statistic on the next iteration. Such approaches may, however, be highly dependent on the adequacy of the initially selected a priori noise model.

B. Further Embodiments

Let us now describe further embodiments of the invention, together with considerations regarding how these embodiments may be implemented, for example, by software, hardware, or a combination of software and hardware.

In one embodiment of the invention, the method includes the following steps:
(1) The method starts with an observables noise model intentionally selected as manifestly over-optimistic, which is below or far below the expected noise level. In other words, a manifestly over-optimistic noise model is chosen for a set of available NSS observables.
(2) A chi-squared statistic is then computed for this set of NSS observables. This corresponds to a particular implementation of sub-step s302 described for example with reference to FIG. 1.
(3) The best candidate for deselection is then identified (this corresponds to a particular implementation of sub-step s304 described for example with reference to FIG. 1) and the chi-squared statistic is re-computed with the identified best candidate removed (this corresponds to a particular implementation of sub-step s306 described for example with reference to FIG. 1).

(4) The ratio (original chi-squared statistic divided by updated chi-squared statistic) is then computed. This corresponds to a particular implementation of a first part of sub-step s308 described for example with reference to FIG. 1.

(5) Since the noise model is over-optimistic (as explained under above point (1)), the computed ratio has generally a negligible dependency on the input noise values. Thus, it is typically quasi-independent from the input noise level and can be used for further evaluations.

(6) For each number of degrees of freedom (NDF), percentiles for the expected ratio may be computed or may have been pre-computed.

(7) A preset percentile (for example a 95-percentile) is defined and the computed ratio is checked against a threshold corresponding to the preset percentile (this corresponds to a particular implementation of the comparison performed in sub-step s308 described for example with reference to FIG. 1). This answers the question as to whether the improvement to the chi-squared statistic due to best candidate isolation is better than it would be in 95 percent of the cases.

(8) If the isolation of the identified observable results in a large chi-squared improvement (i.e., the test discussed under above point (7) is passed), then the identified observable is regarded as an outlier and removed from the current set (this corresponds to a particular implementation of sub-step s310 described for example with reference to FIG. 1) and the method returns to above-discussed step (2) with the reduced set of observables (this corresponds to the arrow originating from box "s312" towards box "s30" in FIG. 1).

(9) If the isolation of the identified observable results in a small chi-squared improvement (i.e., the test discussed under above point (7) failed), then the method breaks from the loop and scales the a priori overoptimistic noise model to match the final chi-squared statistic (this corresponds to a particular implementation of sub-step s316 described for example with reference to FIG. 3), thus making it adequate to the actual data in processing.

(10) In one embodiment, to ensure higher robustness, the method may comprise, in step (9), temporarily removing an identified observable (this corresponds to a particular implementation of sub-step s326 described with reference to FIG. 5) and then returning to step (2) with the reduced set of observables. The method may then break from the loop only upon identifying some number of consecutive "best candidates", which were identified as non-outliers. Upon finally breaking from the loop, the temporarily removed observables are restored as non-outliers (this corresponds to a particular implementation of sub-step s332 described with reference to FIG. 5) to be used in position estimation.

In one embodiment, the ratio of the first statistic to the second statistic is equal to:

$$\text{ratio} = \frac{\chi^2}{\chi^2_{j_{best}}} = \frac{\sum_i \frac{r_i^2}{\sigma_i^2}}{\sum_{i \neq j_{best}} \frac{r^2_{reduced\ set, i}}{\sigma_i^2}}$$

wherein
$\chi^2 = \Sigma n_i^2$ (for i=1 ... n), with $n_i$ being the normalized residuals obtained from the estimator upon processing the current set of observables, $\chi_j^2 = \Sigma m_i^2$ (for i=1 ... m; i≠j), with $m_i$ being the normalized residuals obtained from the estimator upon processing the reduced set of observables, i.e. the set from which observable with index j was removed, i.e. deselected; and $j_{best}$ is the observable for which $\chi^2_{j_{best}} = \min(\chi_j^2)$.

Two examples will now be described with reference to FIGS. 7a to 7c (example 1) and FIGS. 8a to 8c (example 2) to illustrate how the method in accordance with an embodiment of the invention may help improve the accuracy of a positioning system, compared to a non-claimed reference implementation.

In both examples, a delta-carrier-phase observable GNSS-only trajectory estimator was operated, which provides a generally highly accurate position change of the NSS receiver with respect to its initial position. By "GNSS-only", it is meant here that no inertial navigation system (INS) was used. The NSS receiver in each of these two examples was stationary, except for two vibration events experienced in the first example. The delta-carrier-phase observable GNSS-only trajectory estimator was therefore monitoring the trajectory of the equipment to which the NSS receiver was attached. Since the final trajectory is constructed as accumulated sum of the estimated position increments, the accuracy of the position increments estimated by this estimator is reflected in the divergence of the trajectory from the initial point. This makes it convenient to explain the advantages of the described method by simply looking at the trajectory divergence, without the need to compute some statistical characteristics of the position accuracy.

Figure 7A:
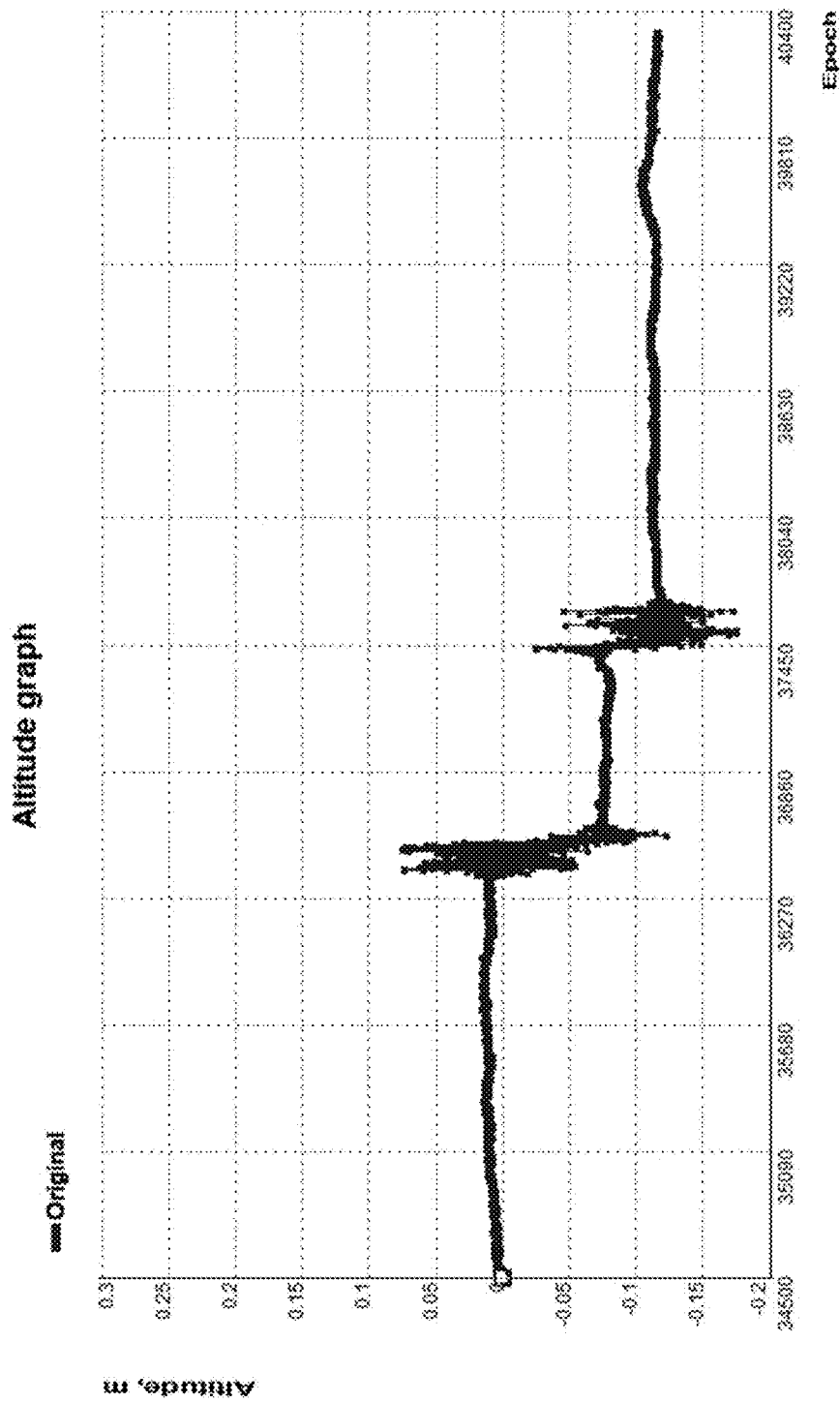
FIG. 7a is a graph showing an estimate of the altitude over time of a stationary NSS receiver, which experienced two vibration events (with amplified noise of the input observables during these events), when using a method in accordance with a non-claimed reference implementation.
Figure 7B:
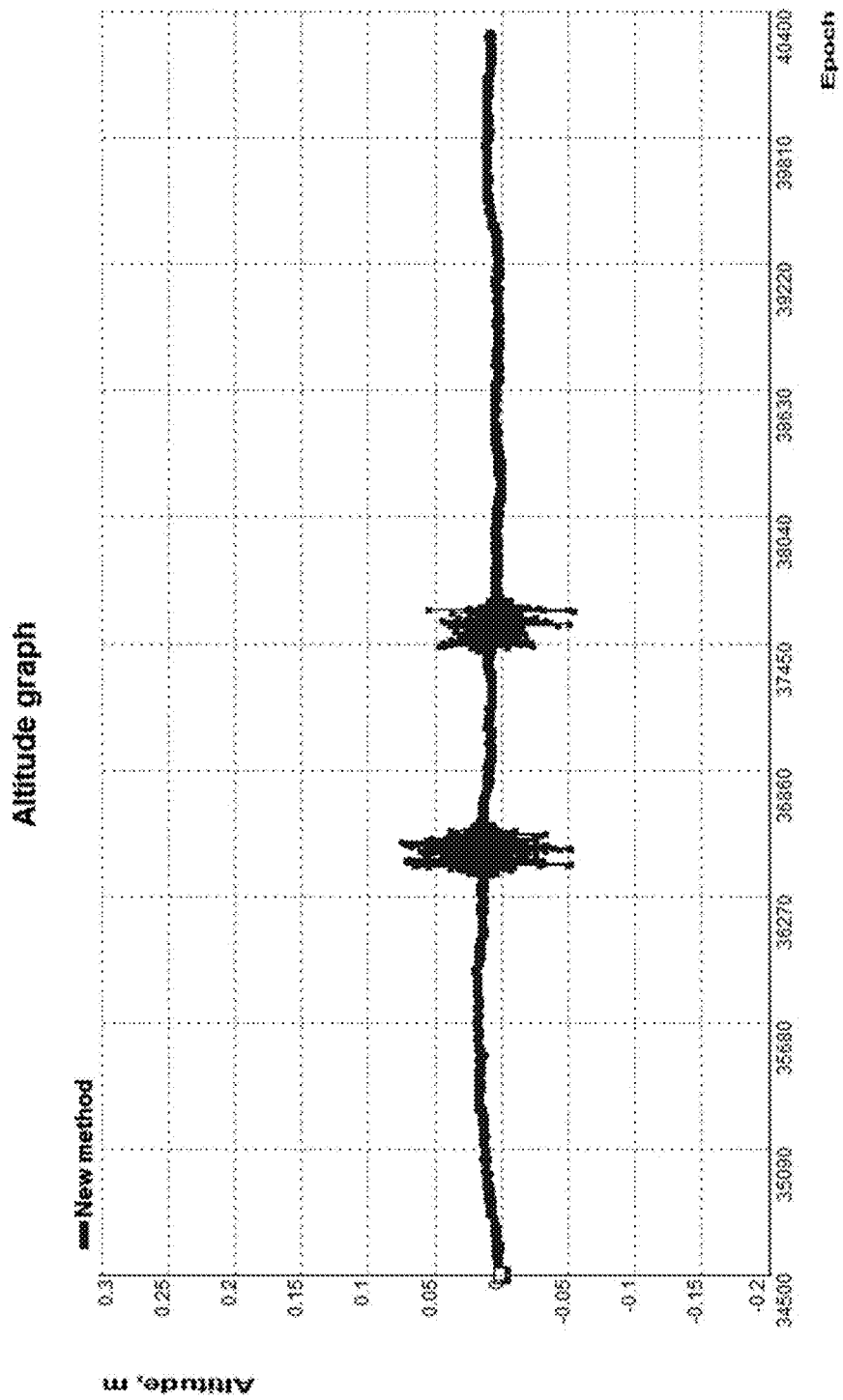
Figure 7C:
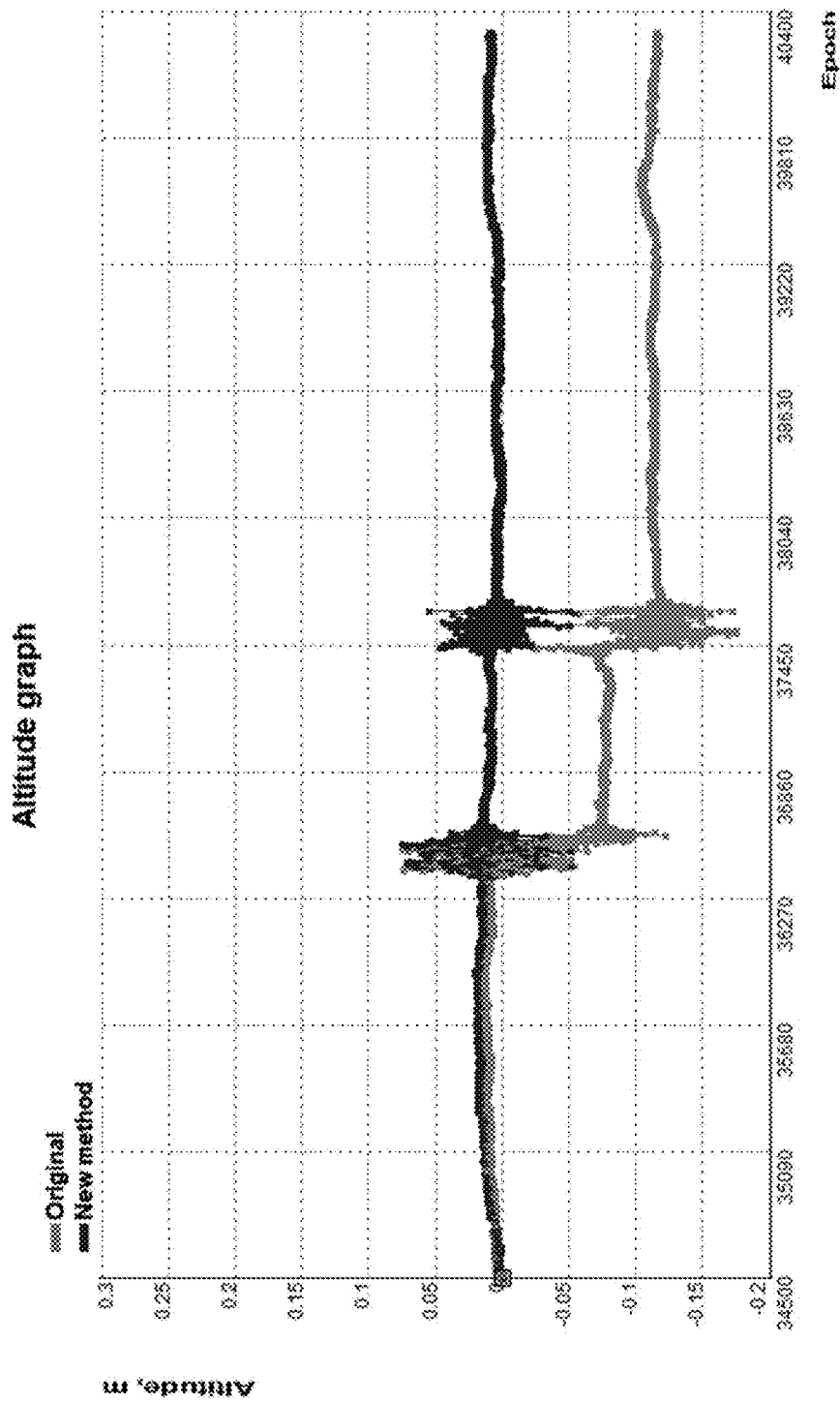
FIG. 7c is a graph superimposing the estimates of FIGS. 7a and 7b.

Example 1 is illustrated by FIGS. 7a to 7c. An NSS receiver was attached to a heavy equipment (in example 1, a construction grader). The NSS receiver experienced vibration events during operation of the heavy equipment. FIGS. 7a to 7c show an estimate of the altitude of the equipment over time. Vibration events are clearly seen by an increased noise in the altitude estimate. Between vibration events, the equipment was stationary, i.e. it remained at the same position, as mentioned above.

FIG. 7a corresponds to the operation of a method in accordance with a non-claimed reference implementation, which utilizes a known chi-squared test for outlier detection. The operation was stable during stationary intervals, but a considerable drift can be observed during vibration events (between epoch 36270 and epoch 36860 and later around epoch 37450). This shows the deficiency of the method in accordance with the non-claimed reference implementation. An a priori noise model was adequate for stationary periods but was not adequate (i.e., too optimistic) during the vibration events, when the carrier phase noise produced by the NSS receiver increases. This resulted in many false outlier detections, which led to a low number of used satellites and thus to degraded satellite constellation geometry, which in turn caused a significant degradation of the computed position (position change in this example).

FIG. 7b corresponds to the same data (as the one used to produce the graph of FIG. 7a) being processed with a method in accordance with an embodiment of the invention, said embodiment combining the embodiment described with reference to FIGS. 4 and 5 and the embodiment described with reference to FIG. 6. The method properly identified the absence of outliers and adjusted the noise level in such a way that it became adequate to the actual noise of the observables. This allowed to generally maintain good positioning results with no divergence during vibration events.

FIG. 7c shows the estimated trajectories of FIGS. 7a and 7b superimposed to illustrate the improvement achieved using the method in accordance with an embodiment of the invention compared to the method in accordance with the non-claimed reference implementation.

Figure 8A:
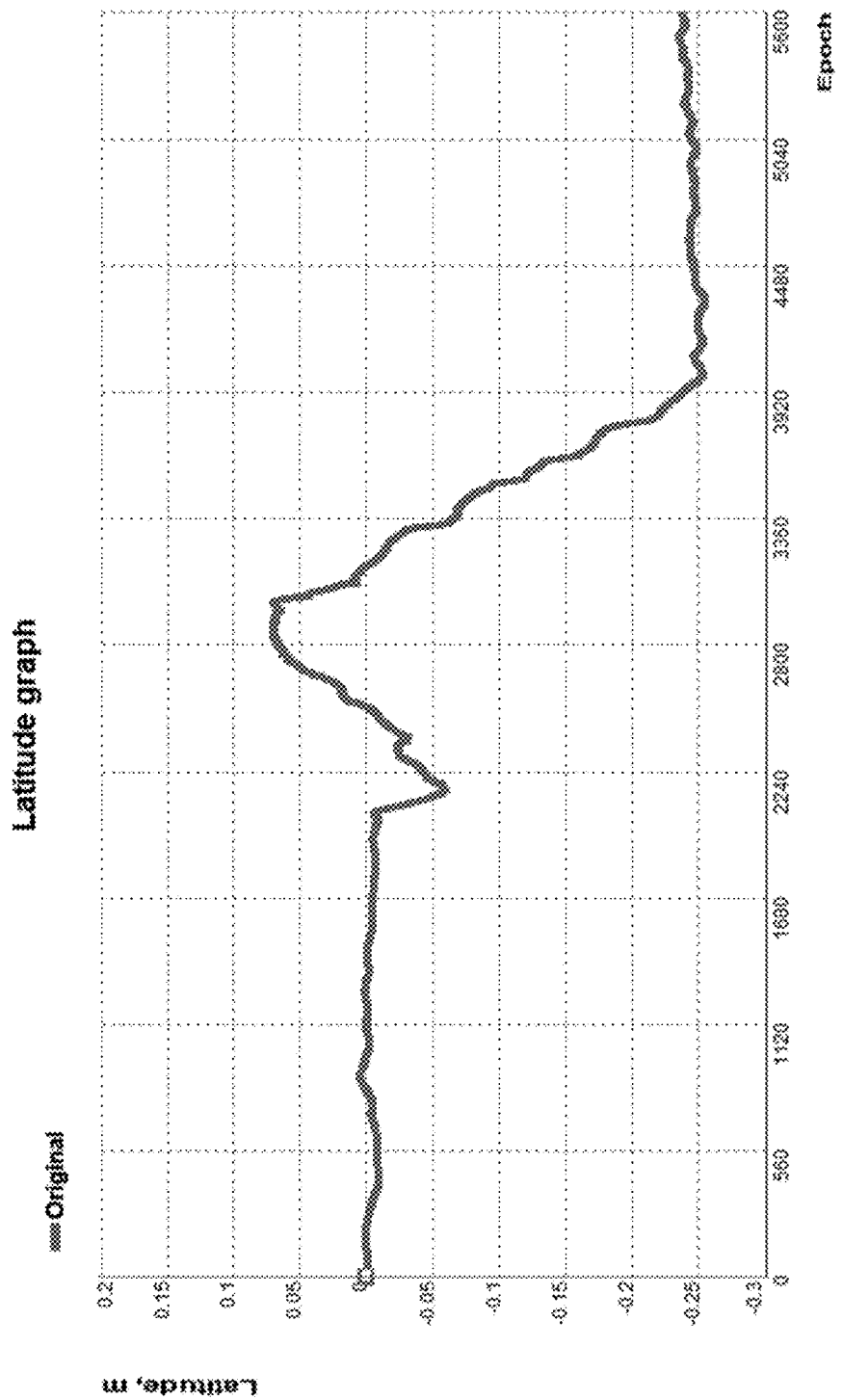
FIG. 8a is a graph showing an estimate of the latitude over time of a stationary NSS receiver, which would experience jamming and spoofing during operation (causing outliers on some signals of some of the NSS satellites), when using a method according to a non-claimed reference implementation.
Figure 8B:
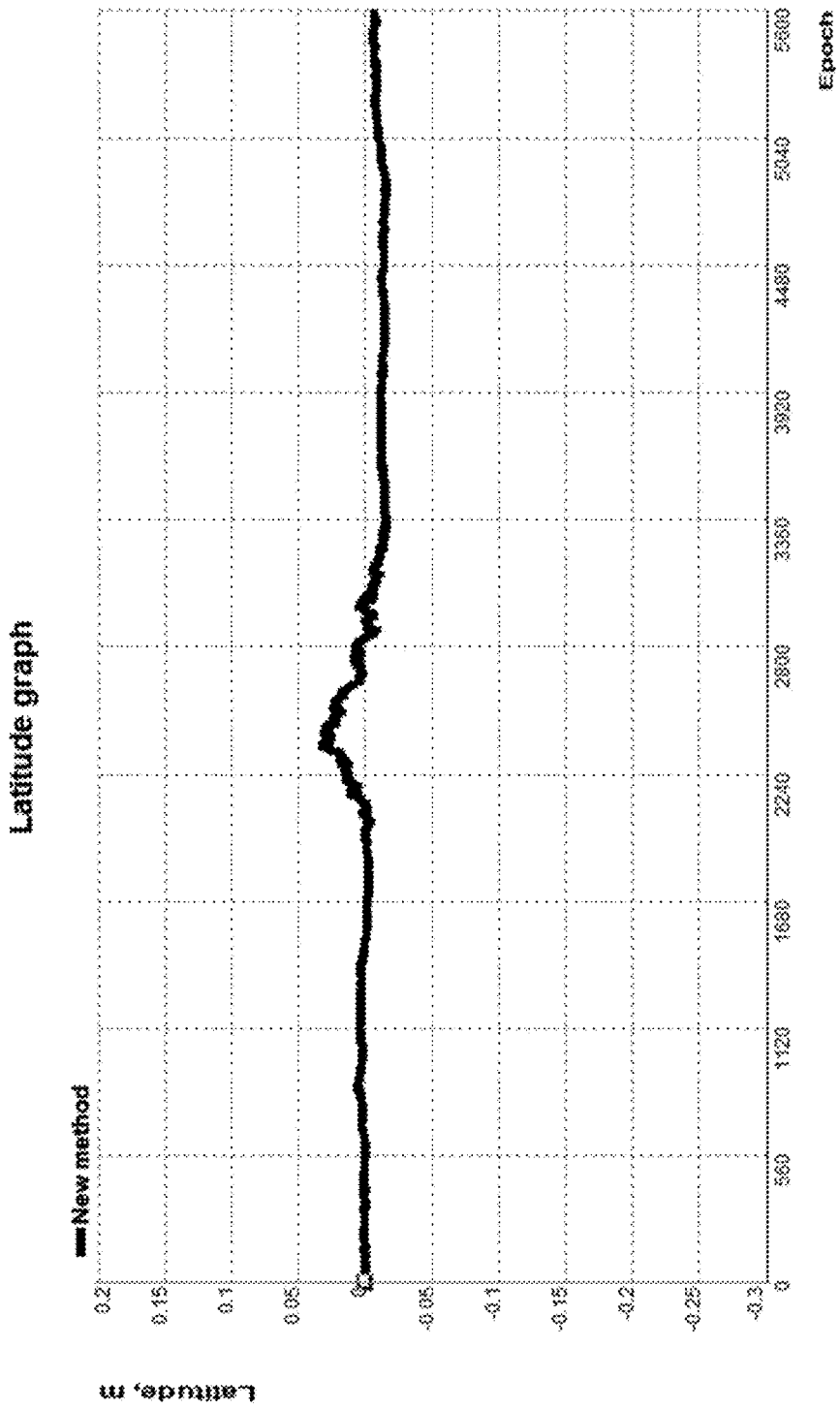
Figure 8C:
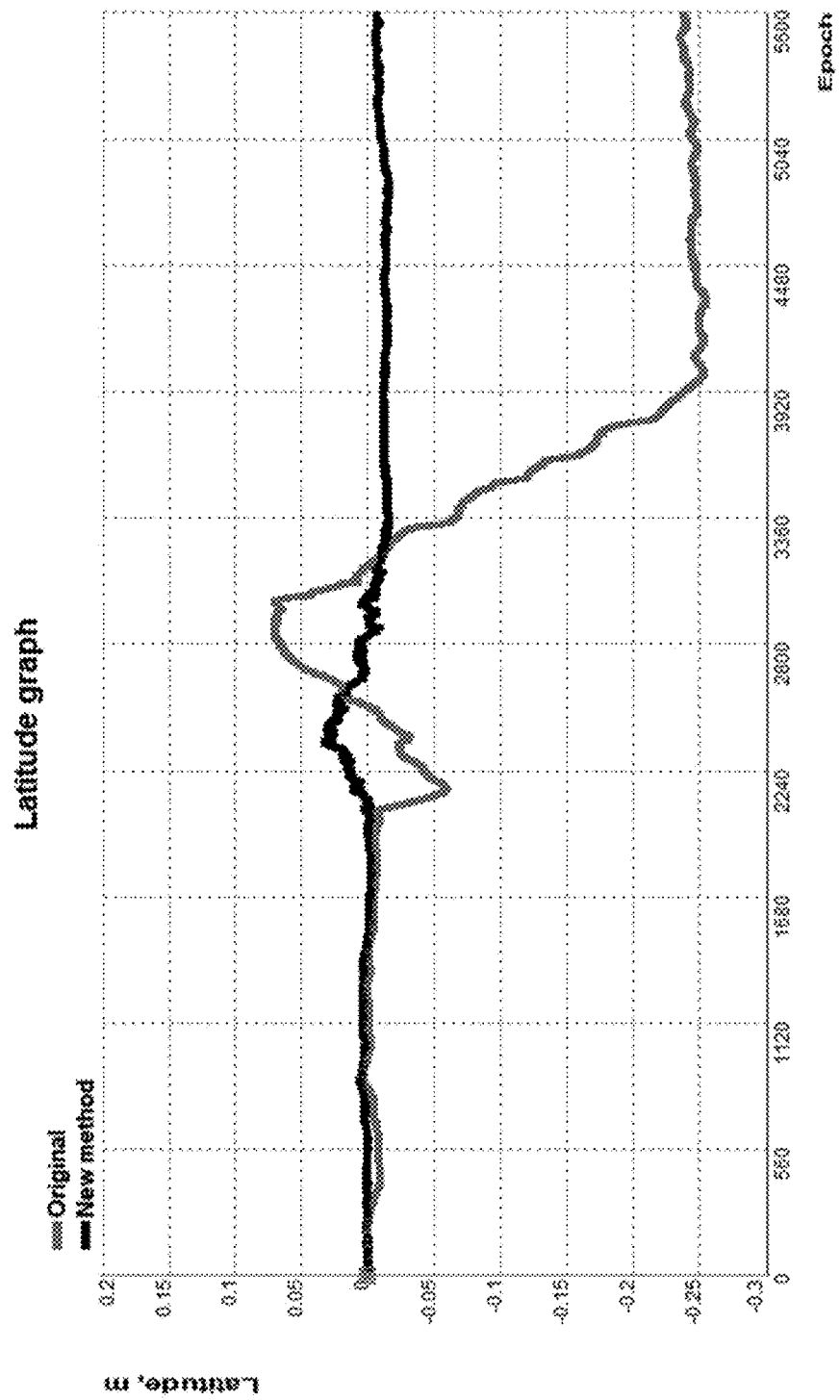
FIG. 8c is a graph superimposing the estimates of FIGS. 8a and 8b.

Example 2 is illustrated by FIGS. 8a to 8c. This example shows a trajectory (position change) computed by the delta-carrier-phase observable GNSS-only trajectory estimator for a stationary NSS receiver that would experience first jamming and then spoofing.

More specifically, the plots of FIGS. 8a to 8c were produced as follows. In order to simulate jamming and spoofing, pre-collected NSS raw data that neither experienced spoofing nor jamming was taken. During the first third and the last third of the test, the data was not altered.

During the first half of the middle third of the data, artificial random noise was added to the code, carrier phase, and Doppler observables, on the L1 band. This was performed for all satellites to simulate jamming on the L1 band.

During the second half of the middle third of the data, the noise level was reduced by 5 to 10 times compared to the first half of the second third, and in addition an artificial drift was introduced in the code, carrier phase, and Doppler observables for three satellites to simulate an effect of spoofing.

FIG. 8a shows the trajectory computed by the delta-carrier-phase observable GNSS-only trajectory estimator with a known chi-squared outlier detection mechanism being used, in accordance with a non-claimed reference implementation. A jamming/spoofing event occurred in the middle third of the period shown. The system detected the jamming/spoofing event and provided some over-pessimistic a priori noise model to the delta-carrier-phase observable GNSS-only trajectory estimator. As a result, no outliers were identified, and no observables were removed, i.e. deselected. This negatively affected the final accuracy.

FIG. 8b shows the trajectory computed by the same delta-carrier-phase observable GNSS-only trajectory estimator but with a method in accordance with an embodiment of the invention, said embodiment combining the embodiment described with reference to FIGS. 4 and 5 and the embodiment described with reference to FIG. 6. The operation of the method led to identifying three outliers (spoofed satellites) and provided a reasonably small noise level for the remaining satellites, which were not affected.

FIG. 8c shows the trajectories of FIGS. 8a and 8b plotted in a superimposed manner to illustrate the improvement achieved using the method in accordance with an embodiment of the invention compared to the method in accordance with the non-claimed reference implementation.

From these two examples, a skilled person would understand that methods in accordance with embodiments of the invention generally work equally well for cases when the overall noise level increases with no outstanding outliers (see example 1), and for cases when some number of outstanding outliers would have otherwise compromised the positioning system (see example 2).

C. System

Figure 9:
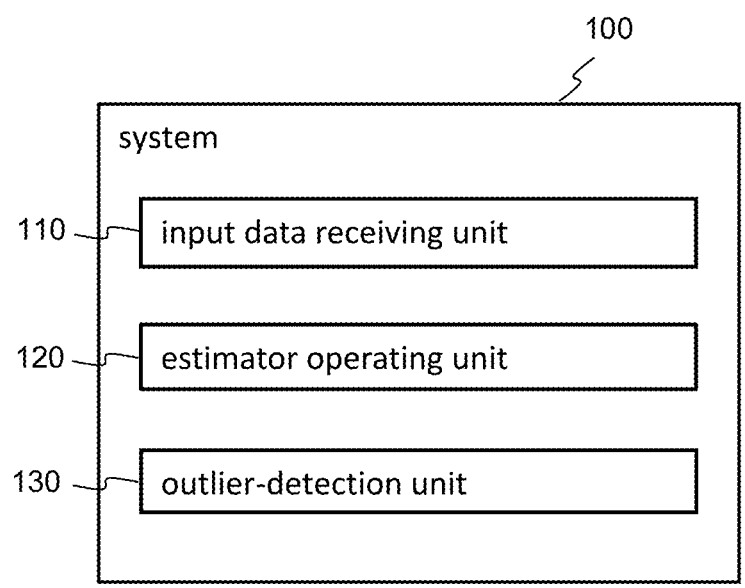
FIG. 9 schematically illustrates a system in one embodiment of the invention.

FIG. 9 schematically illustrates a system 100 in one embodiment of the invention. System 100 comprises an NSS receiver and/or a processing entity capable of receiving data from the NSS receiver. The system operates to estimate parameters derived from NSS signals useful to, i.e. suitable to, determine a position. The NSS receiver is configured for observing at least one NSS signal from each of a plurality of NSS satellites over multiple epochs. System 100 comprises an input data receiving unit 110, an estimator operating unit 120, and an outlier-detection unit 130. Input data receiving unit 110 is configured for receiving input data comprising at least one of: (i) NSS signals observed by the NSS receiver, the NSS signals comprising at least one NSS signal from a first NSS satellite and at least one NSS signal from a second NSS satellite, and (ii) information derived from said observed NSS signals. Estimator operating unit 120 is configured for operating an estimation process, here referred to as "estimator", wherein the estimator uses state variables and computes the values of its state variables at least based on the received input data. Outlier-detection unit 130 is configured for performing an outlier detection procedure as discussed above.

In one embodiment, a vehicle comprises a system 100 as described above. The vehicle may for example be an autonomous vehicle such as a self-driving vehicle, a driverless vehicle, a robotic vehicle, a highly automated vehicle, a partially automated vehicle, an aircraft, or an unmanned aerial vehicle. The vehicle may for example be a car, a truck, a bus, a motorcycle, a tractor, a combine harvester, a crop sprayer, a construction equipment, a construction grader, or a train. Exemplary applications may include machine guidance, construction work, operation of unmanned aerial vehicles (UAV), also known as drones, and operation of unmanned surface vehicles/vessels (USV).

Additional Remarks

Any of the above-described methods and their embodiments may be implemented, at least partially, by means of a computer program or a set of computer programs. The computer program(s) may be loaded on an apparatus, such as for example an NSS receiver (running on a rover station, on a reference station, or within a vehicle) or a server (which may comprise one or a plurality of computers). Therefore, the invention also relates, in some embodiments, to a computer program or set of computer programs, which, when carried out on an apparatus as described above, such as for example an NSS receiver (running on a rover station, on a reference station, or within a vehicle) or a server, carries out any one of the above-described methods and their embodiments.

The invention also relates, in some embodiments, to a computer-readable medium or a computer-program product including the above-mentioned computer program. The computer-readable medium or computer-program product may for instance be a magnetic tape, an optical memory disk, a magnetic disk, a magneto-optical disk, an SSD, a CD ROM, a DVD, a CD, a flash memory unit, or the like, wherein the computer program is permanently or temporarily stored. In some embodiments, a computer-readable medium (or to a computer-program product) has computer-executable instructions for carrying out any one of the methods of the invention.

In one embodiment, a computer program as claimed may be delivered to the field as a computer program product, for example through a firmware or software update to be installed on receivers already in the field. This applies to each of the above-described methods and apparatuses.

NSS receivers may include one or more antennas, configured to receive the signals at the frequencies broadcasted by the satellites, processor units, one or a plurality of accurate clocks (such as crystal oscillators), one or a plurality of central processing units (CPU), one or a plurality of memory units (RAM, ROM, flash memory, or the like), and a display for displaying position information to a user.

Where the terms "input data receiving unit", "estimator operating unit", "outlier-detection unit", and the like are used herein as units (or sub-units) of an apparatus (such as an NSS receiver), no restriction is made regarding how distributed the constituent parts of a unit (or sub-unit) may be. That is, the constituent parts of a unit (or sub-unit) may be distributed in different software or hardware components or devices for bringing about the intended function. Further, the units may be gathered together for performing their functions by means of a combined, single unit (or sub-unit).

The above-mentioned units and sub-units may be implemented using hardware, software, a combination of hardware and software, pre-programmed ASICs (application-specific integrated circuit), etc. A unit may include a central processing unit (CPU), a storage unit, input/output (I/O) units, network connection devices, etc.

Although the present invention has been described on the basis of detailed examples, the detailed examples only serve to provide the skilled person with a better understanding and are not intended to limit the scope of the invention. The scope of the invention is defined by the appended claims.

ABBREVIATIONS

BDS BeiDou Navigation Satellite System
C/A coarse/acquisition (code)
CPU central processing unit
GNSS global navigation satellite system
GPS Global Positioning System
INS inertial navigation system
I/O input/output
IP Internet Protocol
LMS least mean squares
NAVIC NAVigation with Indian Constellation
NDF number of degrees of freedom
NSS navigation satellite system
PRN pseudo-random number
QZSS Quasi-Zenith Satellite System
RAM random-access memory
RNSS regional navigation satellite system
ROM read-only memory
SNR signal-to-noise ratio

REFERENCES

[1] Hofmann-Wellenhof, B., et al., "GNSS, Global Navigation Satellite Systems, GPS, GLONASS, Galileo, & more", Springer-Verlag Wien, 2008.
[2] EP 3 035 080 A1 titled "Navigation satellite system positioning involving the generation of correction information" (Trimble ref.: A4396)
[3] EP 3 130 943 A1 titled "Navigation satellite system positioning involving the generation of tropospheric correction information" (Trimble ref.: 15072-EPO)
[4] EP 3 792 665 A1 titled "Protection level generation methods and systems for applications using navigation satellite system (NSS) observations" (Trimble ref.: 19019-EP)
[5] EP 3 336 584 A1 titled "Outlier-tolerant navigation satellite system positioning method and system" (Trimble ref.: 16032-EP)
[6] Jurisch, R., Kampmann, G., Linke, J., "Introducing the Determination of Hidden (Latent) Inner Restrictions within Linear Regression Analysis", Geodesy—The Challenge of the 3rd Millennium, Springer, Berlin, Heidelberg, 2003, 333-348.
[7] Jan Van Sickle, "Two Types of Observables|GEOG 862: GPS and GNSS for Geospatial Professionals", John A. Dutton e-Education Institute, College of Earth and Mineral Sciences, The Pennsylvania State University, retrieved from https://www.e-education.psu.edu/geog862/ node/1752 on Nov. 8, 2021

The invention claimed is:

1. Method, carried out by at least one of a navigation satellite system receiver, hereinafter abbreviated as "NSS receiver", and a processing entity capable of receiving data from the NSS receiver, for estimating parameters useful to determine a position, the NSS receiver observing at least one NSS signal from each of a plurality of NSS satellites over multiple epochs, the method comprising:
  receiving input data comprising at least one of:
    NSS signals observed by the NSS receiver, the NSS signals comprising at least one NSS signal from a first NSS satellite and at least one NSS signal from a second NSS satellite, and
    information derived from said observed NSS signals;
  operating an estimation process, hereinafter referred to as "estimator", wherein the estimator uses state variables and computes the values of its state variables at least based on the received input data; and
  performing a procedure, hereinafter referred to as "outlier detection procedure", comprising:
    computing a first statistic based on data outputted from the estimator, the data being associated with a set, hereinafter referred to as "current set", of NSS observables;
    identifying, among the NSS observables of the current set, an NSS observable candidate for removal;
    computing a second statistic based on the data outputted from the estimator from which the data associated with the identified NSS observable has been removed; and
    determining whether the ratio of the first statistic to the second statistic exceeds a threshold, hereinafter referred to as "first threshold", and, if so, removing the identified NSS observable from the current set, having the estimator recompute the values of its state variables without the removed NSS observable, and performing the outlier detection procedure again based on data newly outputted from the estimator.

2. Method of claim 1, wherein the estimator comprises at least one of a Kalman filter, and a least mean squares estimator.

3. Method of claim 1, wherein the first statistic and the second statistic each comprise at least one of:
  a chi-squared statistic; and
  an empirically selected test-statistic.

4. Method according to claim 1, wherein the first threshold is a value associated with a percentile of a distribution underlying the ratio of the first statistic to the second statistic, wherein the percentile is preferably a value comprised between 90 and 99.5 percent, and more preferably a value comprised between 93 and 98 percent.

5. Method according to claim 1, wherein the data that is outputted from the estimator and based on which the first statistic and the second statistic are computed comprises residuals, each residual corresponding to an NSS observable.

6. Method of claim 5, wherein the residuals comprise at least one of:
- code observation residuals;
- carrier phase observation residuals;
- Doppler observation residuals;
- delta code observation residuals; and
- delta carrier phase observation residuals.

7. Method of claim 5, wherein each of the first statistic and the second statistic are computed based on data comprising a vector formed by values each based on one of the residuals together with its associated standard deviation.

8. Method according to claim 5,
wherein the first statistic comprises one of:
- the sum, over all the NSS observables of the current set, of the ratio of the squared residual corresponding to the NSS observable under consideration to the squared standard deviation corresponding to the NSS observable under consideration;
- the sum, over all the NSS observables of the current set, of the ratio of the absolute value of the residual corresponding to the NSS observable under consideration to the standard deviation corresponding to the NSS observable under consideration; and
- the maximum absolute value, over all the NSS observables of the current set, of the ratio of the residual corresponding to the NSS observable under consideration to the standard deviation corresponding to the NSS observable under consideration; and the second statistic comprises one of:
- the sum, over all the NSS observables of the current set from which the identified NSS observable has been removed, of the ratio of the squared residual corresponding to the NSS observable under consideration to the squared standard deviation corresponding to the NSS observable under consideration;
- the sum, over all the NSS observables of the current set from which the identified NSS observable has been removed, of the ratio of the absolute value of the residual corresponding to the NSS observable under consideration to the standard deviation corresponding to the NSS observable under consideration; and
- the maximum absolute value, over all the NSS observables of the current set from which the identified NSS observable has been removed, of the ratio of the residual corresponding to the NSS observable under consideration to the standard deviation corresponding to the NSS observable under consideration.

9. Method according to claim 1, wherein identifying, among the NSS observables, an NSS observable candidate for removal comprises:
identifying the NSS observable which removal from the current set results in the smallest second statistic.

10. Method according to claim 1, wherein the outlier detection procedure further comprises:
if it has been determined that the ratio of the first statistic to the second statistic does not exceed the first threshold, adjusting a noise model of the estimator.

11. Method of claim 10, wherein adjusting the noise model of the estimator comprises:
scaling the noise model based on the last computed first statistic.

12. Method of claim 11, wherein the first statistic comprises a chi-squared statistic, and wherein scaling the noise model based on the last computed first statistic comprises:
multiplying each a priori standard deviations respectively associated with the NSS observables in the noise model by a scaling factor that would make the recomputed chi-squared statistic match another threshold, hereinafter referred to as "second threshold", associated with the chi-squared distribution for the estimator's current number of degrees of freedom.

13. Method according to claim 1, further comprising:
initiating a counter for counting a number of temporarily removed NSS observables;
wherein the outlier detection procedure further comprises:
if it has been determined that the ratio of the first statistic to the second statistic does not exceed the first threshold:
incrementing the counter;
determining whether the counter's value is smaller than another threshold, hereinafter referred to as "third threshold", and, if so, temporarily removing the identified NSS observable from the current set, having the estimator recompute the values of its state variables without the removed NSS observable, and performing the outlier detection procedure again based on data newly outputted from the estimator and without resetting the counter; and,
if it has been determined that the counter's value is not smaller than the third threshold, reinserting any temporarily removed NSS observable into the current set and adjusting a noise model of the estimator.

14. Method of claim 13, wherein the third threshold is a value selected among the following integer values: 2, 3, 4, and 5.

15. Method according to claim 1, wherein:
in the outlier detection procedure, the current set of NSS observables corresponding to the data outputted from the estimator and based on which the first statistic is computed comprises not more than one NSS observable per NSS satellite; and
the outlier detection procedure further comprises:
if it has been determined that the ratio of the first statistic to the second statistic exceeds the first threshold, further performing the following:
determining whether the removed NSS observable corresponds to a satellite in relation to which another NSS observable, not forming part of the current set, is available, and, if so, adding said other NSS observable to the current set, in which case the estimator recomputes the values of its state variables with the removed NSS observable being replaced with the added other NSS observable.

16. System comprising at least one of a navigation satellite system receiver, hereinafter abbreviated as "NSS receiver", and a processing entity capable of receiving data from the NSS receiver, the system being for estimating parameters useful to determine a position, the NSS receiver being configured for observing at least one NSS signal from each of a plurality of NSS satellites over multiple epochs, and the system being configured for:
receiving input data comprising at least one of:
NSS signals observed by the NSS receiver, the NSS signals comprising at least one NSS signal from a first NSS satellite and at least one NSS signal from a second NSS satellite, and
information derived from said observed NSS signals;
operating an estimation process, hereinafter referred to as "estimator" wherein the estimator uses state variables and computes the values of its state variables at least based on the received input data; and performing a procedure, hereinafter referred to as "outlier detection procedure", comprising:

computing a first statistic based on data outputted from the estimator, the data being associated with a set, hereinafter referred to as "current set", of NSS observables;

identifying, among the NSS observables of the current set, an NSS observable candidate for removal;

computing a second statistic based on the data outputted from the estimator from which the data associated with the identified NSS observable has been removed; and determining whether the ratio of the first statistic to the second statistic exceeds a threshold, hereinafter referred to as "first threshold", and, if so, removing the identified NSS observable from the current set, having the estimator recompute the values of its state variables without the removed NSS observable, and performing the outlier detection procedure again based on data newly outputted from the estimator.

17. Vehicle comprising a system according to claim 16, the vehicle preferably being at least one of: a motor vehicle, an agricultural tractor, a combine harvester, a crop sprayer, a construction equipment, a truck, a bus, a train, a motorcycle, an autonomous vehicle, a self-driving vehicle, a driverless vehicle, a robotic vehicle, a highly automated vehicle, an aircraft, and an unmanned aerial vehicle.

18. Computer program or set of computer programs comprising computer-readable instructions configured, when executed on a computer or set of computers, to cause the computer or set of computers to carry out the method according to claim 1.

19. Computer program product or storage mediums comprising a computer program or set of computer programs according to claim 18.

* * * * *